US006821583B2

(12) United States Patent
Shouldice et al.

(10) Patent No.: US 6,821,583 B2
(45) Date of Patent: Nov. 23, 2004

(54) IMAGEABLE ELEMENT FOR SINGLE FLUID INK

(75) Inventors: Grant Thomas Donald Shouldice, Rahway, NJ (US); Shashikant Saraiya, Parlin, NJ (US); Xing-Fu Zhong, Wallington, NJ (US); Richard R. Durand, Jr., Oradell, NJ (US); Jianbing Huang, Trumbell, CT (US); Patrick Friedman, Bridgewater, NJ (US)

(73) Assignee: Kodak Polychrome Graphics LLC, Norwalk, CT (US)

( * ) Notice: Subject to any disclaimer, the term of this patent is extended or adjusted under 35 U.S.C. 154(b) by 30 days.

(21) Appl. No.: 10/189,169

(22) Filed: Jul. 3, 2002

(65) Prior Publication Data

US 2004/0009363 A1 Jan. 15, 2004

(51) Int. Cl.[7] ................................................ B32B 27/30

(52) U.S. Cl. ................ 428/32.1; 428/32.24; 428/195.1; 428/463; 428/520; 428/522; 427/152

(58) Field of Search ................................ 428/463, 520, 428/522, 32.1, 32.24, 195.1; 427/152

(56) References Cited

U.S. PATENT DOCUMENTS

| | | | | |
|---|---|---|---|---|
| 3,803,070 | A | | 4/1974 | Spencer et al. |
| 4,045,232 | A | | 8/1977 | Parkinson |
| 4,059,554 | A | | 11/1977 | Pacansky |
| 4,981,517 | A | | 1/1991 | DeSanto, Jr. et al. |
| 5,658,708 | A | | 8/1997 | Kondo |
| 5,714,300 | A | | 2/1998 | Vermeersch et al. |
| 5,776,653 | A | | 7/1998 | Vermeersch et al. |
| 5,776,654 | A | | 7/1998 | Vermeersch et al. |
| 5,849,842 | A | | 12/1998 | Timpe et al. |
| 5,922,511 | A | | 7/1999 | Vermeersch et al. |
| 6,063,835 | A | | 5/2000 | Ohshima et al. |
| 6,140,392 | A | | 10/2000 | Kingman et al. |
| 6,182,569 | B1 | | 2/2001 | Rorke et al. |
| 6,182,570 | B1 | | 2/2001 | Rorke et al. |
| 6,192,798 | B1 | | 2/2001 | Rorke et al. |
| 6,309,792 | B1 | | 10/2001 | Hauck et al. |
| 6,720,130 | B1 | * | 4/2004 | Zhong et al. ............ 430/273.1 |
| 2002/0169253 | A1 | * | 11/2002 | McGee ........................ 525/58 |
| 2003/0104175 | A1 | * | 6/2003 | Kolke et al. ................ 428/195 |
| 2004/0009363 | A1 | * | 1/2004 | Shouldice et al. .......... 428/523 |
| 2004/0067439 | A1 | * | 4/2004 | Zhong et al. ............ 430/273.1 |

FOREIGN PATENT DOCUMENTS

| | | | |
|---|---|---|---|
| EP | 0 632 002 | A1 | 4/1995 |
| EP | 1147886 | A2 | 10/2001 |

* cited by examiner

*Primary Examiner*—D Lawrence Tarazano
(74) *Attorney, Agent, or Firm*—Faegre & Benson LLP

(57) ABSTRACT

The present invention provides an imageable element, which includes: a substrate; a crosslinked layer disposed on the substrate; and an imageable ink-receptive layer disposed on the crosslinked layer, the imageable ink-receptive layer including an ablation free imageable composition. The present invention provides methods of producing the above imaged element.

33 Claims, No Drawings

IMAGEABLE ELEMENT FOR SINGLE FLUID INK

BACKGROUND OF THE INVENTION

1. Field of the Invention

The present invention relates to an imageable element, including a substrate, a crosslinked layer disposed on the substrate and an imageable ink-receptive layer disposed on the crosslinked layer. More particularly, the present invention relates to an imageable element, wherein the imageable ink-receptive layer includes an ablation free imageable composition.

2. Description of the Prior Art

It has been known for some time that water-in-oil emulsions are formed when lithographic inks encounter fountain solution in the nips between the plate cylinder and the ink form rollers. In fact, a substantial amount of water can be emulsified in this fashion during normal printing (about 15–20%) (P. J. Hartsuch, Chemistry of Lithography, $2^{nd}$ Ed., 248, (1960)).

The study of in situ lithographic emulsions and the associated implications for print quality has been going on for almost as long (see J. S. Lavelle, W. D. Schaeffer and A. Z. Zettlemoyer, PRIA Preceedings, Rome, (1969)).

The presence of in situ ink emulsions does not necessarily detract from the performance of any given lithographic ink as long as a separate fountain solution can be used to balance printing properties. On the other hand, the industry as long sought an alternative to using fountain solution to moderate the printing process without having to resort to expensive press modifications and/or non-commercial printing plates. The notion that an ink emulsion (i.e. so called single fluid ink) might possibly deliver both hydrophilic and oleophilic phases to the printing plate in the absence of fountain solution naturally follows from the knowledge gained from the study of in situ ink emulsions. However, asking an ink emulsion to do the work of ink and fountain solution is a rather tall order.

Some of the potential industrial solutions to this challenge can be gleaned from the patent literature. Recently, Kingman et al. published U.S. Pat. No. 6,140,392 that disclosed a lithographic ink composition including acid-functional vinyl polymer and a polyol phase (K. P. Kingman, R. A. Balyo and M. V. Oberski, U.S. Pat. No. 6,140,392, (2000)).

They claim that this particular composition can be used in lithographic printing without fountain solution. Kingman et al. disclosed the specific use of an acid functional vinyl polymer in the ink-receptive continuous phase of an ink emulsion.

The "vinyl" polymer described in the patent is a relatively low molecular weight copolymer of styrene, stearyl methacrylate, butyl acrylate, di-vinyl benzene and methacrylic acid. Closer examination of the composition reveals an architecture consistent with that of a polymeric stabilizer suitable for use as an inverse emulsion (water-in-oil) stabilizer. This analysis of the disclosed "vinyl" polymer is even more interesting in light of previous work done by Xerox.

In 1977 John Pacansky claimed a stabilized alcohol or water-in-oil ink emulsion including in part of 20–40% of a resin having polar segments which were miscible with alcohol/water and non-polar segments which were miscible in the non-polar phase of the ink (J. T. Pakansky, U.S. Pat. No. 4,059,554 (1977)). Pacansky suggested that the use of polymeric stabilizers could overcome difficulties associated with controlling the meta-stability of the ink emulsions previously stabilized with surfactants. Poorly stabilized ink/alcohol emulsions were observed to have broken down while standing (i.e. shelf-life stability) and/or prematurely on the ink rollers. However, extremely stable emulsions tended to give poor printing results (i.e. high background/toning).

Pacansky also preferred the use of relatively small polyhydric alcohols such as ethylene glycol and the like, evn though polyhydric alcohols have been the preferred hydrophilic phase for lithographic ink emulsions for many years according to patent literature.

In 1974, Alexander Spencer and Alfred Spicer (Gestetner) obtained a patent for a lithographic printing ink that was produced by suspending ink in a hydrophilic medium that was characterized by a specific viscosity and rheology profile (A. Spencer and A. L. Spicer, U.S. Pat. No. 3,803,070 (1974)). It was claimed that a separate fountain solution was unnecessary. Spencer and Spicer preferred the use of liquid polyhydric alcohol (i.e. ethylene glycol) alone or in combination with water and optionally hydrophilic phase rheology modifiers. It was also suggested that it might be advantageous to include a spreading agent such as acetone, isopropyl alcohol or ethanol in the hydrophilic phase.

In 1977, H. B. Parkinson patented a composition for a single step lithographic ink which also utilized small polyhydric alcohols (H. B. Parkinson, U.S. Pat. No. 4,045,232 (1977)).

This particular invention related the use of acid treated resins in combination with polyhydric alcohol to generate a lithographic ink with specific rheology. Parkinson claimed that the strong mineral acid treatment of the ink resin imparted the improved properties in this field. De Santo et al. also claimed the use of acid in a single fluid type ink system (R. F. De Santo, S. S. Carava, H. B. Parkinson, U.S. Pat. No. 4,981,517 (1991)).

In this case phosphoric acid was claimed as a stabilizer. The other important features of their invention composition included a diluent with properties similar to fuel oil (No 1, No 2) and a polyol (i.e. ethylene glycol).

Polyhydric alcohols are preferred over water ink emulsions for various reasons not the least of which is the fact that these types of molecules do not evaporate as fast as water. However, a combination of water and polyhydric alcohols are claimed in most cases.

The ink emulsion patent literature contains examples of dispersed phases that were ultimately more complex than just a single polyhydric alcohol and/or a combination of a polyol and water. Hydrophilic phases used in ink emulsions optionally contain a) water b) polyhydric alcohols c) rheology modifiers d) desensitizer/phosphoric acid e) wetting agents f) hygroscopic agents g) anti-corrosive agents h) pH buffers i) surfactants j) chelating agents k) water soluble polymers.

Recently, Ohshima et al. patented an ink emulsion system which relates the use of an emulsified UV cure compound as well as a hygroscopic compound, glycol, triethanol amine and low HLB surfactant (K. Ohshima, M. Imamura, K. Taniguchi, E. Kawamura, H. Adachi, U.S. Pat. No. 6,063,835 (2000)). In this case, the dispersed phase of the emulsion was preferred to be 60–80% by weight. The importance of, and the interest in, the dispersed phase composition is readily apparent. However, the previous work discussed above is lacking with respect to the dispersed phase relative affinity for lithographic plate non-image area.

U.S. Pat. No. 5,714,300 discloses two-layer systems in which the lower layer is a crosslinked hydrolyzed tetraalkyl orthosilicate hydrophilic polymer and the top layer is a negative diazo composition having at least two diazo compounds. In contrast, in the present invention, the lower layer is crosslinked, for example, with zirconium ammonium carbonate, formaldehyde or other non-orthosilicate compounds.

U.S. Pat. No. 5,776,653 discloses a system similar to that disclosed in U.S. Pat. No. 5,714,300 except that the plates are developed on press by wiping with disposable absorbing tissue moistened with water or fountain solution. U.S. Pat. No. 5,776,654 is similar to U.S. Pat. No. 5,776,653 except that the plates are developed on press by fountain solution. U.S. Pat. No. 5,922,511 is similar to U.S. Pat. No. 5,776,654.

The U.S. Pat. Nos. 6,182,569; 6,182,570; and 6,192,798 disclose multi-layer systems, at least one of which is characterized by ablative absorption of laser radiation.

Conventional lithographic plate and ink combinations do not have the ability to provide clean lithographic printing in the absence of fountain solution added on press.

The present invention has utility in single fluid lithography. More particularly, the imageable element according to the present invention can be used advantageously with one fluid offset printing inks and in the preparation of lithographic printing plates that are suitable for use in one fluid offset printing.

Successful single fluid lithography hinges, at least in part, on the ability of the dispersed hydrophilic phase in an ink emulsion to protect the non-image area of the printing plate from ink deposition (i.e. toning, scuming). Therefore, the dispersed phase-non image area interaction and its optimization becomes increasingly important when no additional hydrophilic material (i.e. water, fountain solution) is added on press as is the case with single fluid lithography.

Common difficulties encountered by practitioners of lithography include the poor solubility of the layer components in the solvents selected for the preparation of the coating solutions, insufficient differentiation between the image areas and the non-image areas, poor developability, undesirable scumming during printing, low practical light-sensitivity, poor adhesion of the imaging layer, low resistance to delamination under humid conditions, poor resistance to press chemicals, ablation of the imageable layer and short press life.

Accordingly, it is an object of the present invention to provide an imagable element that has an ablation free imageable ink-receptive layer, which enables the coating edges to be maintained under prolonged development conditions in aggressive developers with little or no loss of the unexposed imageable composition, thereby providing superior press life, resistance to plate chemicals and resistance to scumming and toning of the non-image areas during printing.

The present invention provides such an imageable element, which is suitable for printing with single fluid inks

SUMMARY OF THE INVENTION

The present invention provides an imageable element, including:

a substrate;

a crosslinked layer disposed on the substrate; wherein the crosslinked layer is formed from a polyfunctional crosslinkable resin and a crosslinking agent selected from the group consisting of: a polyvalent metal salt, a polyvalent metal complex, an amino resin crosslinking agent, an amido resin crosslinking agent, an aldehyde crosslinking agent and a combination thereof; and an imageable ink-receptive layer disposed on the crosslinked layer, the imageable ink-receptive layer including an ablation free imageable composition.

The present invention also provides an imageable element, including:

a substrate;

a crosslinked layer disposed on the substrate; and an imageable ink-receptive layer disposed on the crosslinked layer, the imageable ink-receptive layer including an ablation free imageable composition selected from the group consisting of:

a hydroxyfunctional resin including a covalently bound radiation sensitive group capable of increasing the solubility of the imageable composition in an alkaline developer upon exposure to radiation and an isocyanate crosslinking agent;

a thermally sensitive polymer which exhibits an increased solubility in an aqueous developer solution upon heating, the thermally sensitive polymer including at least one covalently bonded unit and at least one thermally reversible non-covalently bonded unit, which includes a two or more centered H-bond within each the non-covalently bonded unit;

a crosslinkable, polyfunctional alkali-soluble polymer and a divinyl ether;

an acid curable composition, an acid generator and optionally, a photothermal converter;

an aromatic diazonium salt containing compound;

a free radical polymerizable composition comprising a polymerizable polyfunctional ethylenically unsaturated compound, a free radical generator and optionally a monofunctional ethylenically unsaturated comonomer;

a crosslinkable composition comprising a polymerizable polyfunctional ethylenically unsaturated compound and optionally a photosensitizer; and a composition comprising an aromatic diazonium salt containing compound, a polymerizable polyfunctional ethylenically unsaturated compound and at least one of a free radical generator and a photosensitizer.

The present invention further provides a method of producing an imaged element including the steps of:

providing an imageable element, including: a substrate; a crosslinked layer disposed on the substrate, wherein the crosslinked layer is formed from a polyfunctional crosslinkable resin and a crosslinking agent selected from the group consisting of: a polyvalent metal salt, a polyvalent metal complex, an amino resin crosslinking agent, an amido resin crosslinking agent, an aldehyde crosslinking agent and a combination thereof; and an imageable ink-receptive layer disposed on the crosslinked layer, the imageable ink-receptive layer including an ablation free imageable composition;

optionally subjecting the imageable ink-receptive layer to reaction conditions sufficient to produce an imageable crosslinked element having a crosslinked ink-receptive layer;

imagewise exposing the crosslinked imageable element to radiation to produce an imagewise exposed element having exposed and unexposed regions; and contacting the imagewise exposed element and a developer to produce the imaged element.

The present invention still further provides a method of producing an imaged element. The method includes the steps of:

providing an imageable element including a substrate, a crosslinked layer disposed on the substrate and an imageable ink-receptive layer disposed on the crosslinked layer, the imageable ink-receptive layer including an ablation free imageable composition selected from the group consisting of: a hydroxyfunctional resin including a covalently bound radiation sensitive group capable of increasing the solubility of the imageable composition in an alkaline developer upon exposure to radiation and an isocyanate crosslinking agent; a thermally sensitive polymer which exhibits an increased solubility in an aqueous developer solution upon heating, the thermally sensitive polymer including at least one covalently bonded unit and at least one thermally reversible non-covalently bonded unit, which includes a two or more centered H-bond within each the non-covalently bonded unit; a crosslinkable, polyfunctional alkali-soluble polymer and a divinyl ether; an acid curable composition, an acid generator and optionally, a photothermal converter; an aromatic diazonium salt containing compound; a free radical polymerizable composition comprising a polymerizable polyfunctional ethylenically unsaturated compound, a free radical generator and optionally a monofunctional ethylenically unsaturated comonomer; a crosslinkable composition comprising a polymerizable polyfunctional ethylenically unsaturated compound and optionally a photosensitizer; and a composition comprising an aromatic diazonium salt containing compound, a polymerizable polyfunctional ethylenically unsaturated compound and at least one of a free radical generator and a photosensitizer;

optionally subjecting the imageable ink-receptive layer to reaction conditions sufficient to produce an imageable crosslinked element having a crosslinked ink-receptive layer;

imagewise exposing the crosslinked imageable element to radiation produce an imagewise exposed element having exposed and unexposed regions; and contacting the imagewise exposed element and a developer to produce the imaged element.

The present invention further still provides a method of producing an inked image including:

providing an imaged element including a substrate, a crosslinked layer disposed on the substrate and an imageable ink-receptive layer disposed on the crosslinked layer, wherein the imageable ink-receptive layer includes an ablation free imageable composition;

imagewise exposing the imageable element to radiation to produce an imagewise exposed element having exposed and unexposed regions;

optionally contacting the imagewise exposed element and a developer to produce the imaged element; and contacting the imaged element and an emulsion ink to provide an inked image for printing.

The present invention still further provides an imaged element produced by the above method.

The present invention provides an imageable element that has an ablation free imageable ink-receptive layer, which enables the coating edges to be maintained under prolonged development even in aggressive developers with little or no loss of the unexposed imageable composition.

Further, the imageable element according to the present invention provides superior press life and chemical resistance to plate chemicals.

Further still, like silicone waterless plates, the imageable element according to the present invention avoids fountain solution thereby minimizing environmental problems and printing cost by reducing paper waste.

The imageable element according to the present invention is also cost-effective because it requires less manpower due to easy operation and automation and, compared to silicone plates, the plates prepared from the imageable element according to the present invention are less expensive to make and can be used for printing on more varieties of papers, including newspaper paper.

DETAILED DESCRIPTION OF THE INVENTION

Lithography is the process of printing from specially prepared surfaces, some areas of which are capable of accepting lithographic ink, whereas other areas, when moistened with water, will not accept the ink. In the art of photolithography, a photographic material is made imagewise receptive to oily inks in the photo-exposed (negative-working) or in the non-exposed areas (positive-working) on a hydrophilic background. The areas which accept ink form the printing image areas and the ink-rejecting areas form the background areas.

Lithographic printing plate precursors, i.e., imageable elements, typically include a radiation-sensitive, ink-receptive coating applied over the hydrophilic surface of a support material. If after exposure to radiation, the exposed regions of the coating become soluble and are removed in the developing process, revealing the underlying hydrophilic surface of the support, the plate is called a positive-working printing plate.

Conversely, if exposed regions become insoluble in the developer and the unexposed regions are removed by the developing process, the plate is called a negative-working plate. In each instance, the regions of the radiation-sensitive layer that remain (i.e., the image areas) are ink-receptive and the regions of the hydrophilic surface revealed by the developer are ink-repellent.

Upon imagewise exposure of the light-sensitive layer in a positive working system, the exposed image areas become soluble and the unexposed areas become insoluble. The plate is then developed with a suitable liquid to remove the photosensitive composition from the exposed areas.

In a preferred embodiment, the present invention provides an imageable element, including:

a substrate;

a crosslinked layer disposed on the substrate; wherein the crosslinked layer is formed from a polyfunctional crosslinkable resin and a crosslinking agent selected from the group consisting of: a polyvalent metal salt, a polyvalent metal complex, an amino resin crosslinking agent, an amido resin crosslinking agent, an aldehyde crosslinking agent and a combination thereof; and an imageable ink-receptive layer disposed on the crosslinked layer, the imageable ink-receptive layer including an ablation free imageable composition.

Preferably, the crosslinked layer in the imageable element is more receptive to a polyhydric alcohol than to ink. Thus, the crosslinked layer forms a contact angle of 80 degrees or less with a droplet of diethylene glycol in ink oil. Preferably, the crosslinked layer forms a contact angle with a droplet of diethylene glycol in ink oil of 70 degrees or less, more preferably 50 degrees or less, and most preferably 30 degrees or less.

Preferably, the crosslinked layer is hydrophilic.

In another preferred embodiment, the imageable composition can include:

(1) a hydroxyfunctional resin including a covalently bound radiation sensitive group capable of increasing the solubility of the imageable composition in an alkaline developer upon exposure to radiation and an isocyanate crosslinking agent;

(2) a thermally sensitive polymer which exhibits an increased solubility in an aqueous developer solution upon heating, the thermally sensitive polymer including at least one covalently bonded unit and at least one thermally reversible non-covalently bonded unit, which includes a two or more centered H-bond within each the non-covalently bonded unit;

(3) a crosslinkable, polyfunctional alkali-soluble polymer and a divinyl ether;

(4) an acid curable composition, an acid generator and optionally, a photothermal converter, such as, an infrared absorber;

(5) an aromatic diazonium salt containing compound;

(6) a free radical polymerizable composition comprising a polymerizable polyfunctional ethylenically unsaturated compound, a free radical generator and optionally a monofunctional ethylenically unsaturated comonomer;

(7) a crosslinkable composition comprising a polymerizable polyfunctional ethylenically unsaturated compound and optionally a photosensitizer; and (8) a composition comprising an aromatic diazonium salt containing compound, a polymerizable polyfunctional ethylenically unsaturated compound and at least one of a free radical generator and a photosensitizer.

The crosslinked layer, sometimes referred to herein as the “bottom layer,” is formed from a polyfunctional crosslinkable resin and a crosslinking agent. Preferably, the polyfunctional crosslinkable resin has at least two same or different crosslinkable functional groups. The polyfunctional crosslinkable resin can be a hydroxyfunctional resin, a carboxyfunctional resin, a silanol functional resin, a mercaptofunctional resin, an amidofunctional resin, a sulfonamidofunctional resin, a carbamate functional resin, an epoxyfunctional resin, a sulfonate functional resin, a sulfate functional resin, or a mixture thereof.

Examples of the hydroxyfunctional resin include polyvinyl alcohol, a silanol functional polyvinyl alcohol, a methacrylamide functional polyvinyl alcohol, a sulfate functional polyvinyl alcohol, a thiol functional polyvinyl alcohol, a carboxy functional polyvinyl alcohol, a sulfate functional polyvinyl alcohol, an acrylic resin, a polyester resin, a polyurethane resin, a polyol, a polyfunctional phenolic resin, a novolak resin, a pyrogallol/acetone resin, polyvinyl phenol polymer, vinyl phenol/hydrocarbyl acrylate copolymer, a resole resin, and a mixture thereof.

Examples of the carboxyfunctional resin include polyacrylic acid, polymethacrylic acid, copolymers thereof and mixtures thereof.

Examples of the amidofunctional resin include polyacrylamide, polymethacrylamide, copolymers thereof and mixtures thereof.

The crosslinking agent preferably is a polyvalent metal salt, a polyvalent metal complex, an aldehyde crosslinking agent, i.e., a dialdehyde, such as, glyoxal and glutaraldehyde, an isocyanate crosslinking agent, an amino resin crosslinking agent, an amido resin crosslinking agent, such as, alkoxymethylated acrylamide and methacylamide polymers and copolymers, or a combination thereof.

Preferably, the polyvalent metal salt or the polyvalent metal complex has a metal, such as, magnesium, aluminum, calcium, titanium, ferrous, cobalt, copper, strontium, zirconium, stannous or stannic. The counter anion or the ligand of the polyvalent metal salt or complex can be, for example, a halide, nitrate, sulfate, bisulfate, cyano, carbonate, bicarbonate or acetate.

Examples of the polyvalent metal salt or complex include ammonium zirconium(IV) carbonate, ammonium zirconium (IV) hydroxy carbonate, a iron ferrocyanide, a iron ferricyanide or a combination thereof. Such polyvalent metal salts useful for crosslinking hydrophilic polymers are described in U.S. Pat. No. 6,171,748 (see col. 3, lines 62–67), the contents of which are incorporated herein by reference.

Examples of the isocyanate crosslinking agent include isophorone diisocyanate, methylene-bis-phenyl diisocyanate, toluene diisocyanate, hexamethylene diisocyanate, tetramethylxylylene diisocyanate, dimers thereof, adducts thereof with diols, adducts thereof with triols, adducts thereof with polyols, adducts thereof with polyesters, adducts thereof with acrylic resins, adducts thereof with polyurethane polyols, adducts thereof with an isocyanate blocking agent and mixtures thereof.

Examples of the amido resin crosslinking agent include polyalkoxymethylacrylamide, polyalkoxymethylmethacrylamid, copolymers of alkoxymethylacrylamide, copolymers of alkoxymethylmethacrylamide and mixtures thereof.

Examples of the amino resin crosslinking agent include di(alkoxymethyl)melamine, tri(alkoxymethyl)melamine, tetra(alkoxymethyl)melamine, penta(alkoxymethyl) melamine, hexa(alkoxymethyl)melamine, an alkoxymethylated benzoguanamine, an alkoxymethylated glycoluril, and mixtures thereof.

Blending functionalized PVOH solutions allows the control of adhesion, surface energy, and reactivity of the non-image area of a lithographic printing plate while maintaining the thermodynamic affinity for polyhydric based dispersed phases of paste ink emulsions. Functional groups can be used to tune the properties listed above while using only one polymeric layer/coating step for the non-image.

In one embodiment, the present invention employs a crosslinked, functionalized polyvinyl alcohol coating as the non-image area of a lithographic printing plate for improved one fluid offset printing with polyhydric alcohol based single fluid paste ink emulsions. Silanol, methacrylamide, carboxylate, sulphate and thiol functional polyvinyl alcohols may be used, which are crosslinked, preferably, with zirconium metal salts.

In another embodiment, polyacrylamide, crosslinked with formaldehyde is utilized as the non-image area.

The imageable ink-receptive layer is sometimes referred to herein as the “hydrophobic layer” or the “top layer.” The imageable element of the present invention can be any ink-receptive imageable layer known in the art, including positive or negative working systems.

Examples of the negative working systems include, for example, an imageable ink-receptive layer that includes a compound having a polymerizable group, such as, an addition polymerizable ethylenically unsaturated group, a crosslinkable ethylenically unsaturated group, a ring-opening polymerizable group (i.e., an epoxide or an oxetane), an azido group, an aromatic diazonium salt group, an aryldiazosulfonate group or combinations thereof.

The addition polymerizable ethylenically unsaturated group is polymerizable by free radical polymerization, cationic polymerization or a combination thereof.

The crosslinkable ethylenically unsaturated group can be, for example, a dimethylmaleimide group, a chalcone group or a cinnamate group. Such photocrosslinkable compositions are described in U.S. Pat. No. 5,112,743, the contents of which are incorporated herein by reference.

The ring-opening polymerizable group can be, for example, an epoxide, an oxetane or a combination thereof. Photoinitiated cationic polymerization of epoxides and oxetanes is well-known in the art. For example, such compositions are disclosed in Japanese Patent Document JP 2001/220526.

Thus, the imageable ink-receptive layer can include one of the following systems:

(1) a hydroxyfunctional resin including a covalently bound radiation sensitive group capable of increasing the solubility of the imageable composition in an alkaline developer upon exposure to radiation and an isocyanate crosslinking agent.

The imageable ink-receptive layer of this type in the imageable element is a positive working, i.e., the imageable ink-receptive layer increases in solubility in an alkaline developer in the exposed regions upon exposure to radiation. The imageable ink-receptive layer in such systems can be crosslinked.

The imageable ink-receptive layer of this type includes a hydroxyfunctional resin including a covalently bound radiation sensitive group capable of increasing the solubility of the imageable composition in an alkaline developer upon exposure to radiation and an isocyanate crosslinking agent.

The imagable composition of this type is radiation imageable using ultraviolet radiation. Upon such imaging the developer solubility of the imaged area is increased to allow differentiation between imaged and non-imaged areas upon development.

The radiation sensitive group is capable of increasing the solubility of the imageable composition in an alkaline developer upon crosslinking an isocyanate crosslinking agent and exposure to radiation. The ultraviolet radiation sensitive compound is preferably a compound represented by the formula:

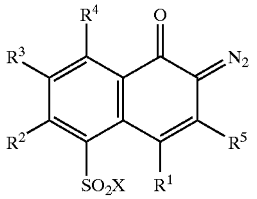

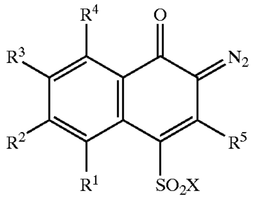

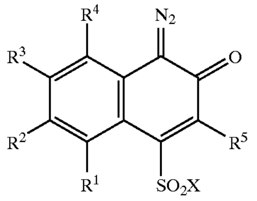

-continued

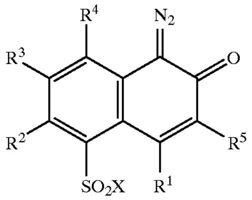

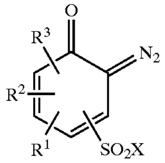

or a mixture thereof; wherein each of $R^1$, $R^2$, $R^3$, $R^4$ and $R^5$ can independently be hydrogen, linear, branched or cyclic alkyl of 1 to 22 carbon atoms, aralkyl of 6 to 22 carbon atoms, aryl, alkaryl, alkoxy of 1 to 22 carbon atoms, haloalkyl, halogen, acyl, ester or cyano; and wherein x is halogen.

Examples of the ultraviolet radiation sensitive compounds include compounds represented by the following formulas:

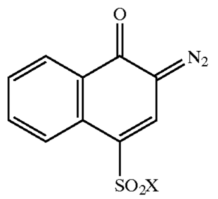

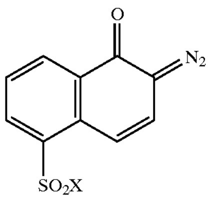

wherein x is chlorine.

The hydroxyfunctional resin, which has a covalently bound radiation sensitive group, is derived from a hydroxyfunctional resin, such as, a polyfunctional phenolic resin, an acrylic resin, a polyester resin, a polyurethane resin, a polyol or a combination thereof. Preferably, the polyfunctional phenolic resin can be a novolak resin, a pyrogallol/acetone resin, polyvinyl phenol polymer, vinyl phenol/hydrocarbyl acrylate copolymer, a resole resin or a mixture thereof. Examples of such resins include a phenol novolak resin, a cresol novolak resin, a phenol/cresol novolak resin, a resole resin or a mixture thereof.

The hydroxyfunctional resin, which includes a covalently bound radiation sensitive group, is prepared by contacting in the presence of a base (i) a radiation sensitive compound represented by the formula:

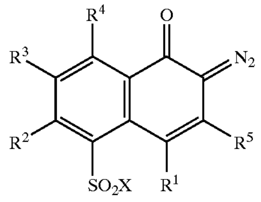

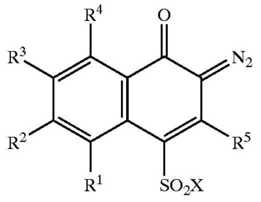

-continued

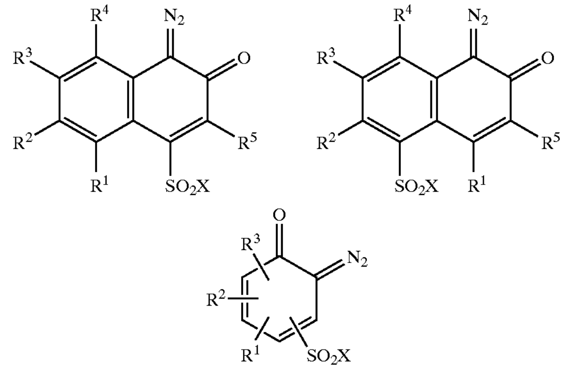

or a mixture thereof; wherein each of $R^1$, $R^2$, $R^3$, $R^4$ and $R^5$ can independently be hydrogen, linear, branched or cyclic alkyl of 1 to 22 carbon atoms, aralkyl of 6 to 22 carbon atoms, aryl, alkaryl, alkoxy of 1 to 22 carbon atoms, haloalkyl, halogen, acyl, ester or cyano; and wherein x is halogen; and (ii) a hydroxyfunctional resin.

The hydroxyfunctional resin can be a polyfunctional phenolic resin, an acrylic resin, a polyester resin, a polyurethane resin, a polyol or a combination thereof and the contacting step is typically carried out under reaction conditions sufficient to produce a hydroxyfunctional resin, which has one or more covalently bound radiation sensitive groups.

The crosslinking agent can be any suitable crosslinking agent known in the art and includes crosslinking agents, such as, an isocyanate crosslinking agent, an amino resin crosslinking agent, an amido resin crosslinking agent, an epoxy compound having at least two epoxide groups and the like. A combination of the aforementioned crosslinkers can also be used.

The crosslinking agent preferably is an isocyanate crosslinking agent that has at least two, preferably more than two isocyanate groups. The term "isocyanate crosslinking agent" in the context of the present invention includes blocked and unblocked isocyanates. Such isocyanate crosslinkers include diisocyanates, such as, isophorone diisocyanate, methylene-bis-phenyl diisocyanate, toluene diisocyanate, hexamethylene diisocyanate, tetramethylxylylene diisocyanate, dimers thereof, adducts thereof with diols, adducts thereof wih triols, adducts thereof with polyols, adducts thereof with polyesters, adducts thereof with acrylic resins, adducts thereof with polyurethane polyols, adducts thereof with isocyanate blocking agents and mixtures thereof.

Any suitable blocking agent can be used to block the isocyanate crosslinking agent. Preferably, the isocyanate blocking agent is a phenol, an oxime, a lactam or a pyrazole and includes isocyanate blocking agents, such as, a phenol, methyl ethyl ketone oxime, 2-pyrrolidone, 2-piperidone, caprolactam and 3,5-dimethylpyrazole. Examples of suitable blocked isocyanate crosslinking agents include Trixene BI 7950 (a 3,5-pyrazole blocked isophoronediisocyanate trimer) and Trixene BI 7960 (a 3,5 dimethyl pyrazole blocked N,N'-tris(6-isocyanatohexyl)imidocarbonic diimide), both available from Baxenden Chemicals, Lancashire, UK.

Preferably, the isocyanate crosslinking agent includes, on average, at least two free or blocked isocyanate groups and more preferably, from about two to about three free or blocked isocyanate groups per isocyanate crosslinking agent.

(2) The imageable ink-receptive layer of this type can include a thermally sensitive polymer which exhibits an increased solubility in an aqueous developer solution upon heating. The thermally sensitive polymer includes at least one covalently bonded unit and at least one thermally reversible non-covalently bonded unit, which includes a two or more centered H-bond within each the non-covalently bonded unit.

The H-bond is preferably a four-centered H-bond including two isocytosine groups. The covalently bonded unit is derived from a polyfunctional material that is soluble or dispersible in an aqueous developer solution.

The thermally sensitive polymer includes a supramolecular polymer derived from monomers represented by the formula:

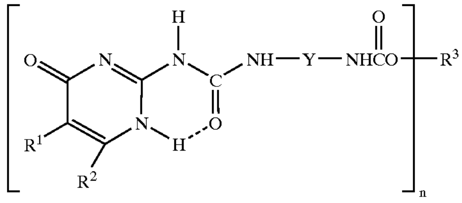

wherein each $R^1$ and $R^2$ is independently selected from the group consisting of: hydrogen and hydrocarbyl;

wherein Y is a hydrocarbylene derived from a diisocyanate represented by the formula $Y(NCO)_2$;

wherein $R^3$ is a phenolic residue derived from a polyfunctional phenolic resin represented by the formula $R^3(OH)_n$; and wherein n is at least 1.

The covalently bonded unit according to the present invention is derived from a polyfunctional material covalently bonded to sites that are also bonded to the non-covalently bonded units. At least one, preferably more than one, same or different polyfunctional materials can be bonded to such sites.

The supramolecular polymer can be any polymer or resin that is capable of producing properties required for thermal imaging. For example, to achieve developability, the polyfunctional material has at least one base-soluble functional group having a pKa of less than 14. Such base-soluble functional groups include, for example, carboxylic, sulfonic, imide, N-acyl sulfonamide and phenolic hydroxy groups. The preferred polyfunctional materials include polyfunctional phenolic resins, acrylic resins, polyester resins, polyurethane resins, and combinations thereof. Preferably, the polyfunctional phenolic resin is a phenol/cresol novolak, polyvinyl phenol polymer, vinyl phenol/hydrocarbyl acrylate copolymer or a mixture thereof.

The imageable ink-receptive layers of this type are also positive working, i.e., the imageable ink-receptive layer increases in solubility in an alkaline developer in the exposed regions upon exposure to radiation.

(3) The imageable ink-receptive layer of this type includes a compound which contains at least 2 vinyl ether groups, such as, a divinyl ether compound, and a crosslinkable, alkali soluble polymer, such as, a polyfunctional phenolic resin or a carboxyfunctional resin. Acetal crosslinks are formed by reaction of the vinyl ether groups with the carboxylic acid or phenolic groups of the alkali soluble resin. An acid precursor is also typically present.

Such an ink-receptive imageable layer can be positive or negative working. In the positive working embodiment, crosslinking occurs during or following application to a substrate. For example, the acid curable composition can be cured by either coating at a higher temperature or by applying sufficient heat to crosslink following application. In the negative working embodiment, the corresponding negative working compositions are coated at low temperature drying conditions and, following exposure, acetal crosslinks are formed.

The polyfunctional phenolic resin can be a novolak resin, a pyrogallol/acetone resin, polyvinyl phenol polymer, vinyl phenol/hydrocarbyl acrylate copolymer, a resole resin or a mixture thereof. Preferably, the polyfunctional phenolic resin is a phenol novolak resin, a cresol novolak resin, a phenol/cresol novolak resin, a resole resin and a mixture thereof. Any suitable divinyl ether can be used.

Such compositions are described in U.S. Pat. Nos. 5,658,708 and 5,364,738, the contents of which are incorporated herein by reference. The latter patent includes an extensive list of divinyl ethers.

The imageable composition of the present invention can also include an acid generator, which is preferably a thermal or ultraviolet radiation activated compound. Upon exposure to, for example, ultraviolet radiation, the acid generator produces a free acid, which acts as a catalyst for acetal formation (negative-working) or reversal of acetal formation (positive-working). Suitable acid generators are disclosed in U.S. Pat. Nos. 5,658,708 and 5,364,738, cited above.

(4) The imageable ink-receptive layer of this type includes an acid curable composition, an acid generator, photothermal converter material, such as, an infrared absorber, and optionally a colorant. The infrared absorber can be a pigment, a dye or a combination thereof.

The acid curable composition can include a binder and a crosslinking agent for that binder. Suitable binders include polymers that have at least two, preferably more than two reactive groups, such as, hydroxy, carboxylic acid, amine, carbamate, amide, sulfonamide or imide. Preferably, the reactive group is a hydroxy group, such that, the polymer can be a polyol, a polyether polyol, a novolak resin, a hydroxyfunctional acrylic resin, a hydroxyfunctional polyester resin and combination thereof.

The crosslinking agent can be any suitable crosslinking agent known in the art and includes crosslinking agents, such as, a resole resin, an amino resin, an amido resin, an epoxy compound having at least two epoxide groups and the like. A combination of the aforementioned crosslinkers can also be used.

The crosslinking agent preferably is an amino resin that has at least two alkoxymethyl groups, including amino resins, such as, an alkoxymethylated melamine resin, an alkoxymethylated benzoguanamine resin, an alkoxymethylated glycoluril, an alkoxymethylated polyacrylamid, an alkoxymethylated polymethacrylamide and a combination thereof. Preferably, the alkyl group in the alkoxymethylated amino resins is derived from an alcohol of 1 to 4 carbon atoms, such as methanol, ethanol, propanol, butyl alcohol, isomers thereof and mixtures thereof. Examples of such amino resins include alkoxymethylated melamine resins having from about 2 to about 6 methoxymethyl groups.

The acid curable composition can include a self-crosslinking material, such as, a resole resin. However, in addition to the resole resin, the acid curable composition can further include a polymer having at least two reactive groups, such as, hydroxy, carboxylic acid, amine, carbamate, amide, suffonamide or imide, to form a crosslinked network with the resole resin. Preferably, the acid curable composition includes a resole resin and a novolak resin.

The acid generator can be an ultraviolet, visible or infrared radiation activated or heat activated compound. Upon exposure to ultraviolet, visible radiation, infrared radiation or heat, either directly, or indirectly through heat transfer from an infrared absorbing compound, the acid generator produces a free acid, which acts as a cure catalyst for the curing process.

Suitable acid generators include a light sensitive triazine compounds, onium salts, diazonium salts, covalently bound sulfonate group containing compounds, hydrocarbylsulfonamido-N-hydrocarbyl sulfonate and a combination thereof.

Examples of such light sensitive triazine acid generators include compounds represented by the formula:

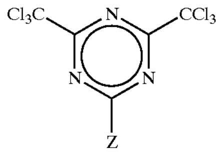

wherein Z can be hydrogen, linear, branched or cyclic alkyl of 1 to 22 carbon atoms, aralkyl of 6 to 22 carbon atoms, aryl, alkaryl, alkoxy of 1 to 22 carbon atoms, haloalkyl, halogen, acyl, ester, cyano, a group represented by the formula:

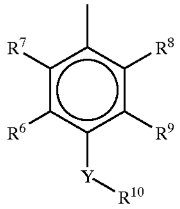

and

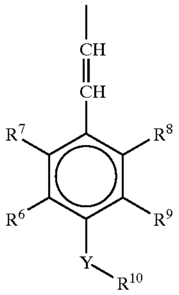

wherein each of $R^6$, $R^7$, $R^8$ and $R^9$ can be hydrogen, linear, branched or cyclic alkyl of 1 to 22 carbon atoms, aralkyl of 6 to 22 carbon atoms, aryl, alkaryl, alkoxy of 1 to 22 carbon atoms, haloalkyl, halogen, acyl, ester or cyano, wherein $R^6$ and $R^7$ and/or $R^8$ and $R^9$ together can form a cycloaliphatic, benzo or a substituted benzo ring;

wherein $R^{10}$ can be a linear, branched or cyclic alkyl of 1 to 22 carbon atoms, aralkyl of 6 to 22 carbon atoms, aryl, alkaryl, haloalkyl, acyl, ester or cyano; and wherein Y is a heteroatom, which can be oxygen or sulfur.

Preferably, the light sensitive triazine compound is represented by the formula:

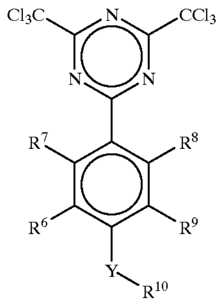

wherein each of $R^6$, $R^7$, $R^8$ and $R^9$ can independently be hydrogen, linear, branched or cyclic alkyl of 1 to 22 carbon atoms, aralkyl of 6 to 22 carbon atoms, aryl, alkaryl, alkoxy of 1 to 22 carbon atoms, haloalkyl, halogen, acyl, ester or cyano, wherein $R^6$ and $R^7$ and/or $R^8$ and $R^9$ together can form a cycloaliphatic, benzo or a substituted benzo ring;

wherein $R^{10}$ can be a linear, branched or cyclic alkyl of 1 to 22 carbon atoms, aralkyl of 6 to 22 carbon atoms, aryl, alkaryl, haloalkyl, acyl, ester or cyano; and wherein Y is a heteroatom, which can be oxygen or sulfur.

Examples of such light sensitive triazine compound include compounds represented by the following formulas:

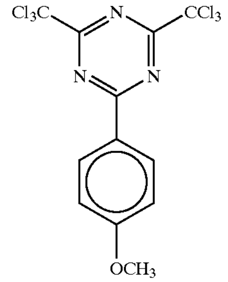
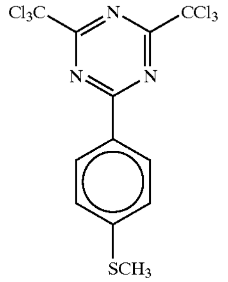
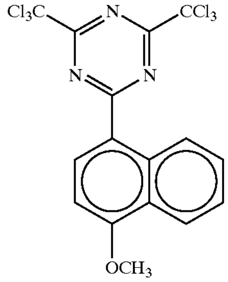
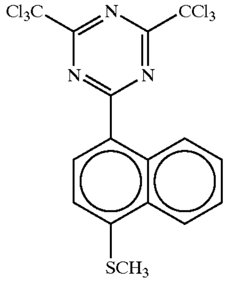

and a mixture thereof.

Examples of the covalently bound sulfonate group containing compounds that are suitable for use as an acid generator include hydrocarbyl sulfonates, such as, methyl tosylate, ethyl tosylate, benzoin tosylate, and the like.

An acid generator can also be a salt. Such acid generators can have any counter anion. However, acid generators having a counter anion derived from a non-volatile acid are preferred. In such acid generator systems that have a counter anion derived from a non-volatile acid, the counter anion can combine with protons to produce a non volatile acid. Unlike volatile acids, such non-volatile acids remain in the imageable composition thereby increasing the speed of color development of the colorant.

The acid generator can be an onium salt that has a non-nucleophilic counter anion derived from a non-volatile acid, such as, sulfate, bisulfate, tetrafluoroborate, hexafluorophosphate, hexafluoroarsenate, hexafluoroantimonate, tetrakis(pentafluorophenyl)-borate, triflate, pentafluoropropionate, pentafluoroethanesulfonate, benzenesulfonate, p-methylbenzenesulfonate and pentafluorobenzene-sulfonate.

Examples of such onium salts include iodonium salts, sulfonium salts, hydrocarbyloxysulfonium salts, hydrocarbyloxyammonium salts, aryl diazonium salts and combinations thereof. Examples of the hydrocarbyloxy ammonium salts include the salts of N-hydrocarbyloxy substituted nitrogen containing heterocyclic compounds, such as, N-ethoxyisoquinolinium hexafluorophosphate. Examples of the iodonium salts include 4-octyloxyphenyl phenyliodonium hexafluoroantimonate.

The acid generator can also be a monomeric or oligomeric aromatic diazonium salt. The monomeric and oligomeric diazonium salts can be any diazonium salt known in the art that is suitable for use in thermal imaging, provided that the diazonium salt has a counter anion that is other than halide. Examples of such counter anions include sulfate, bisulfate, tetrafluoroborate, hexafluorophosphate, hexafluoroarsenate, hexafluoroantimonate, tetrakis (pentafluorophenyl)borate, triflate, pentafluoropropionate, pentafluoroethanesulfonate, benzenesulfonate, p-methylbenzene sulfonate and pentafluorobenzene-sulfonate.

Preferably, such diazonium salts are aromatic and more preferably, are derivatives of diphenylamine-4-diazonium salts, including, for example, for example, 4-diazodiphenylamine sulfate. Examples of such aromatic diazonium salts include: diphenyl-4-diazonium sulfate; 2-4-(N-(naphthyl-2-methyl)-N-propylamino)-benzenediazonium sulfate; chloro-diphenyl-4-diazonium sulfate; 4-(3-phenylpropylamino)-benzenediazonium sulfate; 4-(N-ethyl-N-(benzyl)-amino)-benzenediazonium sulfate; 4-(N,N-dmethyl-amino)-benzenediazonium tetrafluoroborate; 4-(N-(3-phenyl-mercapto-propyl)-N-ethyl-amino)-2-chlorobenzenediazonium sulfate; 4-(4-methylphenoxy)-benzenediazonium sulfate; 4-(phenylmercapto)-benzenediazonium sulfate; 4-phenoxybenzenediazonium sulfate; 4-(benzoylamino)-benzenediazonium hexafluorophosphate; methylcarbazole-3-diazonium sulfate; 3-methyl-diphenyleneoxide-2-diazonium sulfate, 3-methyldiphenylamine-4-diazonium sulfate, 2,3',5-trimethoxydiphenyl-4-diazonium sulfate; 2,4',5-triethoxydiphenyl-4-diazonium sulfate; 4-(3-(3-methoxyphenyl)-propylamino)-benzenediazonium sulfate; 4-(N-ethyl-N-(4-methoxybenzyl)-amino)-benzenediazonium sulfate; 4-(N-(naphthyl-(2)-methyl)-N-n-propylamino)methoxybenzenediazonium sulfate; 4-(N-(3-phenoxypropyl)-N-methylamino)-2,5-dimethoxybenzenediazonium tetrafluoroborate; 4-(N-(3-phenylmercaptopropyl)-N-ethylamino)-2-chloro-5-methoxybenzenediazonium sulfate; 4-(4-(3-methylphenoxy)-phenoxy)-2,5-dimethoxybenzenediazonium sulfate; 4-(4-methoxy-phenylmercapto)-2,5-diethoxybenzenediazonium sulfate; 2,5-diethoxy-4-phenoxybenzenediazonium sulfate; 4-(3,5-dimethoxybenzoylamino)-2,5-diethoxybenzenediazonium hexafluorophosphate; methoxycarbazole-3-diazonium sulfate; 3-methoxy-diphenyleneoxide-2-diazonium sulfate and methoxydiphenylamine-4-diazonium sulfate.

Diazonium salts derived from the following amines are also suitable for use in the present invention: 4-amino-3-methoxydiphenylamine, 4-amino-2-methoxydiphenylamine, 4'-amino-2-methoxydiphenylamine, 4'-amino-4-methoxydiphenylamine, 4-amino-3-ethoxydiphenylamine, 4-amino-3-hexyloxydiphenylamine, 4-amino-3-beta-hydroxyethoxy-diphenylamine, 4'-amino-2-methoxy-5-methyldiphenylamine, 4-amino-3-methoxy-6-methyidiphenylamine, 4'-amino-4-n-butoxydiphenylamine, 4'-amino-3',4-dimethoxydiphenylamine, 4-amino-diphenylamine, 4-amino-3-methyl-diphenylamine, 4-amino-3-ethyldiphenylamine, 4'-amino-3-methyl-diphenylamine, 4'-amino-4-methyl-diphenylamine, 4'-amino-3,3'-dimethyldiphenylamine, 3'-chloro-4-amino-diphenylamine, 4-aminodiphenylamine-2-sulfonic acid, 4-aminodiphenylamine-2-carboxylic acid, 4-aminodiphenylamine-2'-carboxylic acid and 4'-bromo-4-aminodiphenylamine. Preferred are 4-amino-diphenylamine, 3-methyl-4-aminodiphenylamine, 3-alkoxy- 4-aminodiphenylamines having 1 to 3 carbon atoms in the alkoxy group and 3-methoxy-4-aminodiphenylamine.

Examples of the particularly preferred monomeric aromatic diazonium salts include 2-methoxy-4-phenylaminobenzenediazonium hexafluorophosphate (diazo MSPF6) represented by the formula:

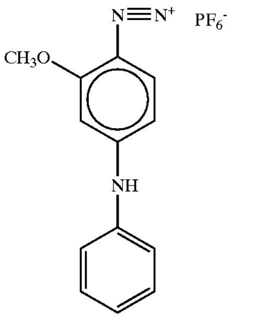

2-methoxy-4-phenylaminobenzenediazonium p-toluenesulfonate represented by the formula:

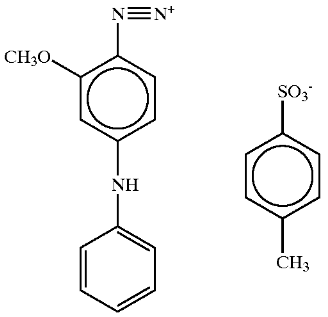

and a combination thereof.

Examples of the particularly preferred oligomeric aromatic diazonium salts include compounds represented by the formula:

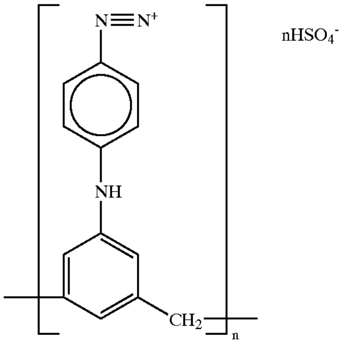

which is manufactured by St. Jean Photochemicals, Quebec, Canada, under the trade name DTS-18;

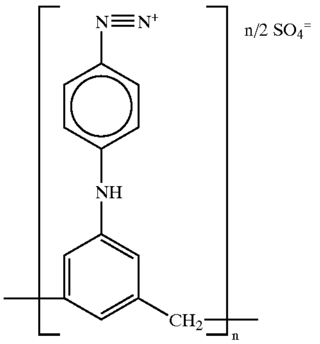

and

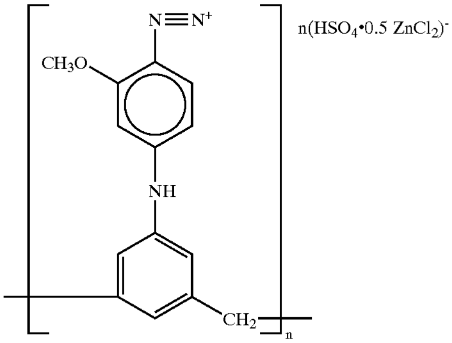

wherein n is from 1 to 11; and a combination thereof.

Mixtures of any of the aforementioned diazonium salts are also suitable. A person of ordinary skill in the art would know how to use other aromatic diazonium salts that are suitable for use in the imagable composition of the present invention.

When an ultraviolet radiation is used with a thermally activated acid generator, the composition can further include a photothermal converter material for converting ultraviolet energy to thermal energy. In addition, a UV/visible sensitizer selected from monomolecular or polymeric compounds containing an anthracene moiety, thioxanthone moiety or alkylaminobenzophenone moiety can also be used.

The imageable ink-receptive layer of this type is a negative working layer, which upon exposure to radiation, decreases in solubility in an alkaline developer in the exposed regions.

(5) The imageable ink-receptive layer of this type includes an aromatic diazonium salt containing compound and, optionally, a binder.

The aromatic diazonium salt containing compound can be derived from a substituted or an unsubstituted aromatic diazonium salt or a mixture thereof. Preferably, the substituent is an alkoxy group.

The alkoxy-substituted aromatic diazonium salt containing compound is the condensation product of an alkoxy-substituted aromatic diazonium salt and a condensation agent preferably selected from the group consisting of: formaldehyde, bis-(alkoxymethyl) diphenyl ether, such as, bis-(methoxymethyl) diphenyl ether, and a combination thereof. Other condensation agents that are suitable for use in the present invention are the condensation agents described in the previously incorporated U.S. Pat. No. 3,867,147.

Preferably, the alkoxy-substituted aromatic diazonium salt is 3-methoxy-4-diazodiphenylamine sulfate. However, any methoxy-substituted aromatic diazonium salt can be used. The counter anion of the aromatic diazonium salt containing an alkoxy substituent or is free of an alkoxy substituent can be any suitable counter anion. Exemplary of such counter anions are: toluene sulfonate, mesitylene sulfonate, sulfate, tetrafluoroborate, hexafluorophosphate, hexafluoroantimonate, hexafluoroarsenate, methanesulfonate, trifluoromethane sulfonate, naphthalene sulfonate and alkyl derivatives, zinc chloride, tetraarylborate, alkyltriarylborate, 2-hydroxy-4-methoxybenzophenone-5-sulfonate and dihydrogen phosphate.

Polymeric counter anions can also be used. Exemplary of such counter anions are: a polymeric counteranion, which is the polymerization or copolymerization product of a sulfonate functional olefinically unsaturated monomer, such as, an alkali metal N-acrylamidoalkyl sulfonate, an alkali metal N-methacrylamidoalkyl sulfonate, an alkali metal styrene-4-sulfonate and mixtures thereof.

The alkoxy-substituted or alkoxy free aromatic diazonium salts preferably have a diarylamine diazonium salt structure, more preferably a diphenylamine diazonium salt structure, with various substituents attached to either of the aromatic rings. Thus, in addition to one or more alkoxy groups, the alkoxy-substituted aromatic diazonium salt can have one or more of other substituents. The alkoxy free aromatic diazonium salt also can have one or more non-alkoxy substituents, provided that the resulting structure remains alkoxy free.

Exemplary of alkoxy substituents which may be linked to either of the aromatic nuclei of the diarylamine diazonium salt to produce an alkoxy-substituted aromatic diazonium salt include: methoxy, difluoromethoxy, ethoxy, hydroxyethoxy, ethoxyethoxy, Exemples of the non-alkoxy substituents which may be linked to the aryl nuclei of the diarylamine diazonium group in addition to one or more alkoxy substituents include: methyl, propyl, isobutyl, trifluoromethyl, fluorine, chlorine, bromine, iodine, amidocarbonyl, phenoxycarbonyl, acetyl, methanesulfonyl, ethanesulfonyl, acetylamino, methylamino, ethylamino, dimethylamino, diethylamino, methylethylamino, phenylamino, benzylamino, methylbenzylamino and ethylbenzylamino.

Suitable alkoxy containing diphenylamine-4-diazonium salts include, for example, the diazonium salts derived from the following amines: 4-amino-3-methoxydiphenylamine, 4-amino-2-methoxydiphenylamine, 4'-amino-2-methoxydiphenylamine, 4'-amino-4-methoxydiphenylamine, 4-amino-3-ethoxydiphenylamine, 4-amino-3-hexyloxydiphenylamine, 4-amino-3-.beta.-hydroxyethoxydiphenylamine, 4'-amino-2-methoxy-5-methyldiphenylamine, 4-amino-3-methoxy-6-methyldiphenylamine, 4'-amino-4-n-butoxydiphenylamine and 4'-amino-3',4-dimethoxydiphenylamine.

Preferred are the 3-alkoxy-4-aminodiphenylamines having 1 to 3 carbon atoms in the alkoxy group and 3-methoxy-4-aminodiphenylamine.

Examples of the methoxy-substituted aromatic diazonium salts include, but are not limited to, the following: 2, 3',5-trimethoxydiphenyl-4-diazonium chloride; 2,4',5-triethoxydiphenyl-4-diazonium chloride; 4-(3-(3-methoxyphenyl)-propylamino)-benzenediazonium sulfate; 4-(N-ethyl-N-(4-methoxybenzyl)-amino)-benzenediazonium chloride; 4-(N-(naphthyl-(2)-methyl)-N-n-propylamino)methoxybenzenediazonium sulfate; 4-(N-(3-phenoxypropyl)-N-methylamino)-2,5-dimethoxybenzenediazonium tetrafluoroborate; 4-(N-(3-phenylmercaptopropyl)-N-ethylamino)-2-chloro-5-methoxybenzenediazonium chloride; 4-(4-(3-methylphenoxy)-phenoxy)-2,5-dimethoxybenzenediazonium sulfate; 4-(4-methoxy-phenylmercapto)-2,5-diethoxybenzenediazonium chloride; 2,5-diethoxy-4-phenoxybenzenediazonium chloride; 4-(3,5-dimethoxybenzoylamino)-2,5-diethoxybenzenediazonium hexafluorophosphate; methoxycarbazole-3-diazonium chloride; 3-methoxy-diphenyleneoxide-2-diazonium chloride and methoxydiphenylamine-4-diazonium sulfate.

A person of ordinary skill in the art would know how to use other aromatic methoxy-containing compounds and other counter anions to obtain a alkoxy-substituted aromatic diazonium salt containing compound that is suitable for use in the imaging layer of the present invention.

Preferably, the counter anion of the aromatic diazonium salt containing compound having an alkoxy substituent can be mesitylene sulfonate, toluene sulfonate, methane sulfonate, naphthalene sulfonate, trifluoromethane sulfonate, hexafluorophophate and tetrafluoroborate.

Similarly, the alkoxy-free aromatic diazonium salt containing compound of the present invention is the condensation product of an aromatic diazonium salt, which is free of an alkoxy substituent, and a condensation agent preferably selected from the group consisting of: formaldehyde, bis-(alkoxymethyl) diphenyl ether and a combination thereof. Other condensation agents that are suitable for use in the condensation agents described in the previously incorporated U.S. Pat. No. 3,867,147.

Preferably, the alkoxy-free aromatic diazonium salt is 4-diazodiphenylamine sulfate. However, any alkoxy-free aromatic diazonium salt can be used. Examples of such alkoxy-free aromatic diazonium salts include: diphenyl-4-diazonium chloride; 2-4-(N-(naphthyl-2-methyl)-N-propylamino)benzenediazonium sulfate; chloro-diphenyl-4-diazonium chloride; 4-(3-phenylpropylamino)-benzenediazonium sulfate; 4-(N-ethyl-N-(benzyl)-amino)-benzenediazonium chloride; 4-(N,N-dmethyl-amino)-benzenediazonium tetrafluoroborate; 4-(N-(3-phenyl-mercapto-propyl)-N-ethyl-amino)-2-chlorobenzened iazonium chloride; 4-(4-methylphenoxy)benzenediazonium sulfate; 4-(phenylmercapto)-benzenediazonium chloride; 4-phenoxybenzenediazonium chloride; 4-(benzoylamino)-benzenediazonium hexafluorophosphate; methylcarbazole-3-diazoniumchloride; 3-methyl-diphenyleneoxide-2-diazoniumchloride and 3-methyldiphenylamine-4-diazonium sulfate.

Suitable alkoxy free diarylamine-4-diazonium salts, i.e., diphenylamine-4-diazonium salts, include, for example, the diazonium salts derived from the following amines: 4-amino-diphenylamine, 4-amino-3-methyl-diphenylamine, 4-amino-3-ethyldiphenylamine, 4'-amino-3-methyl-diphenylamine, 4'-amino-4-methyl-diphenylamine, 4'-amino-3,3'-dimethyldiphenylamine, 3'-chloro-4-amino-diphenylamine, 4-aminodiphenylamine-2-sulfonic acid, 4-aminodiphenylamine-2-carboxylic acid, 4-aminodiphenylamine-2'-carboxylic acid and 4'-bromo-4-aminodiphenylamine.

Preferably employed are 4-amino-diphenylamine and 3-methyl-4-aminodiphenylamine.

As mentioned above, a person of ordinary skill in the art would know how to use other aromatic alkoxy free compounds and other counter anions to obtain an alkoxy free aromatic diazonium salt containing compound that is suitable for use in the imaging layer of the present invention.

The counter anion of the alkoxy-free aromatic diazonium salt containing compound can preferably be toluene sulfonate, mesitylene sulfonate, 2-hydroxy-4-methoxybenzophenone-5 sulfonate, methane sulfonate, naphthalene sulfonate, trifluoromethane sulfonate, hexafluorophophate and tetrafluoroborate.

In a preferred embodiment, the molar ratio of the alkoxy-substituted aromatic diazonium salt to the aromatic diazonium salt free of an alkoxy substituent is from about 0.7:1 to about 70:1. Preferably, the diazonium salt containing compounds include at least 10 wt % of the imaging composition.

A plurality of compounds are suitable as the condensation agent in the preparation of the condensates derived from alkoxy-substituted aromatic diazonium salts and the alkoxy free aromatic diazonium salts.

An important class includes the substituted and unsubstituted aromatic hydrocarbons and aromatic heterocyclic compounds. Examples of unsubstituted aromatic isocyclic and heterocyclic compounds which may be used as components include, e.g., benzene, naphthalene, anthracene, phenanthrene, pyrene, indene, fluorene, acenaphthene, thiophene, furan, benzofuran, diphenylene oxide, benzothiophene, acridine, carbazole, phenothiazine, and others which may be substituted by one or more of the following groups: alkyl of 1 to 20 carbon atoms, aryl of 6 to 20 carbon atoms, aralkyl of 7 to 20 carbon atoms, alkaryl of 7 to 20 carbon atoms, alkoxy, alkoxymethyl, amino, alkylamino, dialkylamino, alkylaminomethyl, dialkylaminomethyl, amido, alkylthio, alkylthiomethyl, hydroxy, acyloxy and acyloxymethyl. The aryl nucleus may carry additional substituents.

According to the above, the condensation agent belongs to the following groups of substances, for example: aromatic compounds (iso- and heterocyclic), unsubstituted aromatic amines, phenols, thiophenols, phenol ethers,thiophenol ethers, diphenyl ethers, dithiophenyl ethers, aromatic compounds substituted by alkyl, aralkyl or aryl groups, urea, thiourea, carboxylic acid amides (aliphatic and aromatic), and sulfonic acid amides (aliphatic and aromatic).

Generally preferred are the condensation agents which have a molecular weight of less than 500, preferably less than 250, amines being calculated as free amines, not in the salt form, and acid groups being calculated in the H-form. If the compounds are aromatic compounds, those compounds are preferred within these limits which contain not more than 4, preferably not more than 1 to 2, most advantageously 2, individual aromatic rings, either fused to each other or connected with each other, preferably by a hetroatom and/or intermediate members.

Generally, the short-chain alkyl and alkoxy groups, i.e., 1 to 4 carbon atoms, and the smaller aromatic radicals in aryl and aralkyl groups, i.e., up to 12 carbon atoms, are preferred, because the corresponding compounds are more easily soluble in the condensation media so that the condensation can be performed more easily.

Exemplary of compounds that are particularly suitable are those which are derived from diphenyl ether, diphenyl sulfide, diphenyl methane, or diphenyl, and may contain one or two substituents selected from halogen atoms, alkyl groups, and alkoxy and alkoxyalkyl groups.

When the condensation agents are condensed with a diazonium salt, such as, unsubstituted diphenylamine-4-diazonium salts or alkoxy substituted diphenylamine-4-diazonium salts, condensates are obtained which can be readily precipitated and in good yields in the form of the salts, for example, of hydrochloric acid, hydrobromic acid, or of suitable sulfonic acids, depending on the desired counter anion to be present in the final condensation product.

The condensates produced by this method are either alkoxy substituted condensates or are condensates that are free of alkoxy substituents, i.e., alkoxy free condensates. The alkoxy substituted and the alkoxy-free condensates are then blended to produce the compositions of the present invention, which include an aromatic diazonium salt containing compound having an alkoxy substituent and an aromatic diazonium salt containing compound free of an alkoxy substituent. A blend of alkoxy substituted and the alkoxy-free condensate is then used in the preparation of the imaging layer.

The diazonium condensate can be a single condensate prepared by condensing a mixture of an alkoxy substituted diazonium salt and an alkoxy-free diazonium salt with a condensing agent to produce a diazonium condensate that is a "mixed" condensate derived from a mixture of an alkoxy substituted diazonium salt and an alkoxy-free diazonium salt. It can also be a blend of a diazonium condensates obtained by condensing an alkoxy substituted diazonium salt to obtain an alkoxy substituted diazonium salt condensate with an appropriate condensing agent and, thereafter, blending the alkoxy substituted diazonium salt condensate with an alkoxy-free diazonium salt condensate prepared by condensing an alkoxy-free diazonium salt condensate with an appropriate condensing agent.

In general, alkoxy-substituted and alkoxy free diazonium salt containing compounds known to be useful in photosensitive compositions can be used in the present invention, including diazonium salts described in the previously mentioned U.S. Pat. No. 3,867,147. The diazonium salt containing compounds may be diazo adducts of a diazo resin with sulfonated acrylic polymers as disclosed in U.S. Pat. No. 5,846,685 and adducts of a diazo resin with sulfonated polyesters as disclosed in U.S. Pat. No. 4,408,532.

The diazonium salt condensates include at least 10 wt % of the total weight of the imaging layer and the diazonium salt containing condensates include at least 15 wt % of the total weight of the imaging layer.

Preferably, the methoxy-substituted diazonium salt condensate is the polycondensation product of 3-methoxydiphenylamine-4-diazonium sulfate and 4,4'-bis-(methoxymethyl)diphenyl ether or an isomer thereof, isolated as an appropriate salt. The methoxy free diazonium salt condensate is preferably the polycondensation product of diphenylamine-4-diazonium sulfate and formaldehyde, isolated as an appropriate salt.

In still another aspect of the present invention, the mixed diazo composition can be used with or without a binder. For example, adducts of diazonium salt condensates with sulfonated polymers can be used without a binder. Such diazonium adducts of diazonium resins with sulfonated acrylic polymers are described in U.S. Pat. No. 5,846,685, the contents of which are incorporated herein by reference. Adducts of diazonium resins with sulfonated polyesters are disclosed in U.S. Pat. Nos. 4,408,532 and 5,846,685, which are both incorporated herein by reference.

Any polymeric binder known to be useful in such negative working photosensitive compositions can be used. The binders usable in the imageable element of the present invention can include as a binder a polyvinyl acetal binder, a polyurethane binder, derived, for example, from an isocyanate-functional prepolymer or isocyanurate trimer, acrylate polymer binder, methacrylate polymer binder and a combination thereof. The polyvinyl acetal binder preferably contains solubilizing groups having a pKa value of about 14 or less. Solubilizing groups include carboxylic acids, sulfonic acids, phenols, sulfonamides, N-acylsulfonamides and N-acylurethanes. Preferably, the solubilizing groups are carboxylic acids.

Examples of the carboxy-functional polyvinyl acetal binders include common polymers that are either commercially available or can be synthsized. Examples of the commercially available binders include any suitable polyvinyl acetal polymer and binders available from Diversitec under the trade name Polymer DT-1. Other methods well-known in the art can also be used.

In addition to the carboxy-functional polyvinyl acetal binders, other binders can also be used. Examples of such binders include polyurethane prepolymer, which can be prepared by reacting a diol and one or more diisocyanates, such as, 2,4-tolylene diisocyanate, 2,6-tolylene diisocyanate, p-xylene diisocyanate, m-xylene diisocyanate, 4,4'-diphenylmethane diisocyanate, 1,5-naphthalene diisocyanate, 3,3'-dimethylbiphenyl-4,4'-diisocyanate, hexamethylene diisocyanate, trimethylhexamethylene diisocyanate, isophorone diisocyanate, 4-4'-methylenebis (cyclohexylisocyanate), methylcyclohexane-2,4-diisocyanate, methylcyclohexane-2,6-diisocyanate and 1,3-bis(isocyanatomethyl)cyclohexane. The diol can have one or more of the following compounds: ethylene glycol, polyethylene glycol, propylene glycol, polypropylene glycol, neopentyl glycol and a mixture thereof.

Binders obtained by polymerizing a free radical polymerizable composition can also be used. Preferably, such binders are acrylic and methacrylic copolymers, which contain alkali soluble groups, such as carboxylic acids.

For polyvinyl acetal binders, the polyvinyl acetal typically is from about 30 wt % to about 80 wt % of the total weight of the imaging layer. Preferably, it is from about 35 wt % to about 50 wt % of the total weight of the imaging layer. Preferably the polyvinyl acetal has 10–60 mol % vinyl alcohol groups, 1–25 mol % vinyl acetate groups, 1–50 mol % vinyl acid groups, 0–60 mol % vinyl aromatic acetal groups and 0–70 mol % vinyl aliphatic acetal groups. Other binders, such as (meth) acrylates and polyurethanes may be utilized together with or in place of the polyvinyl acetal.

(6) The imageable ink-receptive layer of this type includes a free radical polymerizable composition including a polyfunctional ethylenically unsaturated compound, a free radical generator and, optionally, a monofunctional ethylenically unsaturated comonomer.

The polyfunctional ethylenically unsaturated compound can be trimethylolpropane diacrylate, trimethylolpropane triacrylate, pentaerythritol triacrylate, pentaerythritol tetraacrylate, polyurethane diacrylate, polyurethane triacrylate or a mixture thereof.

The monofunctional ethylenically unsaturated comonomer can be an acrylate ester of a linear, branched or cyclic alcohol of 1 to 22 carbon atoms, methacrylate ester of a linear, branched or cyclic alcohol of 1 to 22 carbon atoms, styrene, substituted styrene, alpha-methylstyrene, acrylonitrile, acrylamide, methacrylamide, vinyl ester, hydroxyethyl acrylate, hydroxyethyl methacrylate, hydroxypropyl acrylate, hydroxypropyl methacrylate or mixtures thereof.

The imageable ink-receptive layer can further include a a photothermal converter material. The photothermal converter material can be an absorber of ultraviolet, visible or infrared radiation. The photothermal converter is preferably an infrared absorber, such as, a pigment, a dye or a combination thereof.

Preferably, the free radical generator includes at least one of: a photosensitizer, a photoinitiator and a coinitiator Imageable ink-receptive layer of this type are described in the commonly owned U.S. Pat. No. 6,309,792, the contents of which are incorporated herein by reference. The free radical generators are described in col. 9, line 45 to col. 13, line 29. Such free radical generators include onium salts, such as diaryliodonium, triarylsulfonium and phenacylsulfonium salts, polyhaloalkyl compounds, such as trichloromethyltriazine derivatives, metalocenes, such as titanocenes, hexaaryl-bis-imidazoles, and azinium compounds, such as N-alkoxyl-quinolinium and N-alkoxypyridinium compounds.

Preferably, the free radical generator includes at least one of: a photosensitizer, a photoinitiator and a coinitiator.

The suitable free radical generators include photoinitiators, such as those described in U.S. Pat. No. 5,849,842. Such photoinitiators preferably absorb in the range of from 300 to 800 nm, more preferably 300 to 450 nm and include acetophenone, benzophenone, 2,4-(trichloromethyl)-1,3,5-triazine, benzoin, benzoin ethers, benzoin ketals, xanthone, thioxanthone, acridine or hexaryl-bis-imidazole and derivatives thereof.

The free radical polymerizable component of the mixture of this invention include an acrylic or methacrylic acid derivative having one or more unsaturated group(s), preferably esters of acrylic or methacrylic acid in the form of monomers, oligomers or prepolymers. The suitable as polyfunctional ethylenically unsaturated compounds include, for example, trimethylol propane triacrylate and methacrylate, pentaerythrite triacrylate and methacrylate, dipentaerythritol-monohydroxy pentaacrylate and methacrylate, dipentaerythritol-hexaacrylate and methacrylate, pentaerythritol tetraacrylate and methacrylate, ditrimethylol propane tetraacrylate and methacrylate, diethylene glycol diacrylate and methacrylate, triethylene glycol diacrylate and methacrylate or tetraethylene glycol diacrylate and methacrylate. Suitable oligomers and/or prepolymers are urethane acrylate and methacrylate, epoxide acrylate and methacrylate, polyester acrylate and methacrylate, polyether acrylate and methacrylate or unsaturated polyester resins.

Preferably, the polyfunctional ethylenically unsaturated compound is trimethylolpropane diacrylate, trimethylolpropane triacrylate, pentaerythritol triacrylate, pentaerythritol tetraacrylate, polyurethane diacrylate, polyurethane triacrylate and a mixture thereof.

Preferably, the monofunctional ethylenically unsaturated comonomer is acrylate ester of a linear, branched or cyclic alcohol of 1 to 22 carbon atoms, methacrylate ester of a linear, branched or cyclic alcohol of 1 to 22 carbon atoms, styrene, substituted styrene, alpha-methylstyrene, acrylonitrile, acrylamide, methacrylamide, vinyl ester, hydroxyethyl acrylate, hydroxyethyl methacrylate, hydroxypropyl acrylate, hydroxypropyl methacrylate and mixtures thereof.

The weight ratio of the photoinitiators is preferably 0.01 to 20% and that of the free radical polymerizable component is 5 to 80%, based on the total solids content of imageable composition.

(7) The imageable ink-receptive layer of this type includes a polymerizable composition including a polyfunctional ethylenically unsaturated crosslinkable compound and optionally a photosensitizer. Such compounds contain ethylenically unsaturated crosslinkable groups, including dimethylmaleimide groups, chalcone groups and cinnamate groups. Chalcone and cinnamate groups may reside in the backbone of a polymer or pendent to a polymer backbone. Suitable photosensitizers include thioxanthone and its derivatives and alkylaminoaromatic ketones, such as bis-4, 4'-diethylaminobenzophenone. Suitable ethylenically unsaturated crosslinkable compounds and photosensitizers, as well as mixtures of ethylenically unsaturated crosslinkable compounds together with ethylenically unsaturated compounds, which undergo free radical polymerization are provided in U.S. Pat. No. 5,925,498, the contents of which are incorporated herein by reference.

(8) Diazo hybrid imageable ink-receptive layer systems that include diazonium salt containing compounds, polymerizable polyfunctional ethylenically unsaturated compounds and at least one of a free radical generator and a photosensitizer are preferred compositions. As described above, the free radical polymerizable composition includes a polyfunctional ethylenically unsaturated compound, a free radical generator and, optionally, a monofunctional ethylenically unsaturated comonomer. Polyfunctional ethylenically unsaturated crosslinkable compounds, together with an optional photosensitizer, may also be used, as described above. Such diazo hybrid compositions, which include an aromatic diazonium salt resin as well as ethylenically unsaturated polymerizable compounds and/or crosslinkable compounds are described in U.S. Pat. No. 5,112,743, the contents of which are incorporated herein by reference.

In a preferred embodiment, the present invention utilizes a two-layer composition, in which the lower layer is a crosslinked, preferably hydrophilic layer and the top layer is a photosensitive layer. Imagewise exposure of the plate precursor, followed by aqueous development, reveals selective regions of the lower layer, which correspond to the non-image area of the printing plate. The crosslinked layer is insoluble in the developer. The remaining top layer functions as the ink-receptive layer.

The bottom layer is composed of organic polymers having stronger affinity to ethylene glycol compounds than to ink oils. The top polymeric layer is photosensitive and contains at least one component which absorbs radiation in the UV, Visible or IR range. After proper drying, the coating weight of the imaging layer preferably is in the range of about 0.2 to about 5.0 $g/m^2$, and more preferably in the range from about 0.7 to about 2.5 $g/m^2$.

The plate is imagewise exposed to UV, visible or IR light by digital or analog means, resulting in modification of the solubility properties of the top layer, i.e., renders the layer aither more removable or less removable by a developer liquid. Application of the developer liquid results in selective removal of the exposed or the unexposed areas of the top layer, as the case might be, depending on whether the the layer is positive working or negative working system.

The substrate of the imageable element is typically an aluminum sheet. However, other materials that are commonly known to those skilled in the art can also be used.

Suitable substrates include any sheet material conventionally used to prepare lithographic printing plates, including metals such as aluminum, magnesium, zinc, copper and steel; paper; metalized paper; metal/paper laminate; paper coated on one or both sides with an alpha-olefin polymer such as polyethylene; composite film; perlon gauze; acetate films such as polyvinyl acetate and cellulose acetate film; polyvinyl acetal film; polystyrene film; polypropylene film; polyester film such as polyethylene terephthalate film; polyamide film; polyimide film; nitrocellulose film; polycarbonate film; polyvinylchloride film; composite films such as polyester, polypropylene or polystyrene film coated with polyethylene film; metalized paper or films; metal/paper laminates; Perlon gauze; plates of magnesium, zinc, copper, anodized aluminum, electrochemically roughened aluminum, steel, and the like. The surfaces of the substrate can be subjected to a pretreatment, if necessary, using the surface treatment techniques known in the art to improve adhesion between the substrate and organic coatings.

A preferred substrate for the imageable element of present invention is an aluminum sheet. The preferred aluminum substrate is electrochemically-grained and anodized aluminum, such as commonly used for lithographic printing plates. Anodized substrates can be prepared using sulfuric acid anodization, phosphoric acid anodization or a combination thereof. Other conventional anodization methods can also be used in the preparation of the anodized substrate of the present invention. Graining (or roughening) can be accomplished by mechanical or electrochemical processes or by a combination of both processes. The surface of the aluminum sheet may be treated with metal finishing techniques known in the art including, for example, physical roughening, electrochemical roughening, chemical roughening, anodizing, and silicate sealing and the like. If the surface is roughened, the average roughness (Ra) is preferably in the range from 0.1 to 0.8 μm, and more preferably in the range from about 0.1 to about 0.4 μm. The preferred thickness of the aluminum sheet is in the range from about 0.005 inch to about 0.020 inch.

Post-treatment with phosphate or phosphate/fluoride, followed by silication, can also be used. Preferred post-treatments include silication and polyvinyl phosphonic acid.

The base sheet substrate may serve as the final support, or it may be an intermediate support from which the light-sensitive copying composition may be transferred, by lamination, onto the material to be processed.

The imageable layer can be applied using the application methods known in the art. For example, the components of the imageable composition can be dissolved in solvents, preferably organic solvents, and applied to an aluminum substrate, which has been preferably grained, anodized and post-treated.

The imageable layer of the present invention can also include a colorant. In the context of the present invention, the term "colorant" includes colorant dyes and colorant pigments as well as a combination thereof.

Suitable colorant dyes include crystal violet, crystal violet lactone, ethyl violet, basonyl blue, victoria pure blue BO, victoria blue B, blue colorant dye, such as D11, which is dye victoria blue FBR represented by the formula:

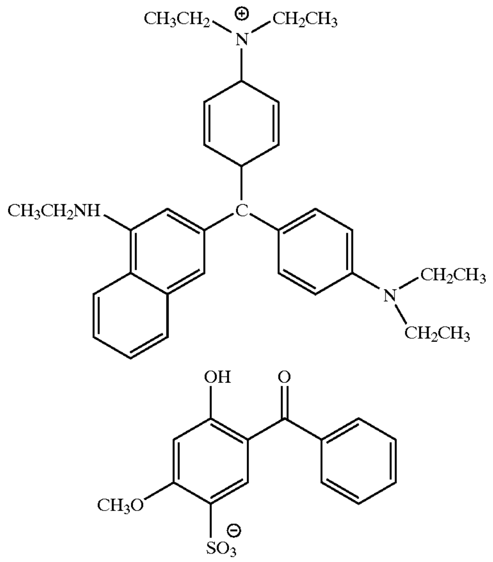

and mixtures thereof.

The imageable element according to the present invention can further contain dyestuffs and/or pigments, such as those mentioned in U.S. Pat. Nos. 3,218,167 and 3,884,693, which can serve to increase the contrast and also to harden the layer.

The imageable layer of the present invention can also include an acid generator, which is preferably a thermal or radiation activated compound. Upon exposure to, for example, ultraviolet radiation, the acid generator produces a free acid, which may react with a dye or leuco dye to increase or decrease color to indicate and differentiate the exposed areas.

The plate precursor may be optionally heated at a temperature from about 80° C. to about 160° C., preferably from about 110° C. to about 140° C. for a period of time from about 45 seconds to about 120 seconds, preferably from about 60 seconds to about 100 seconds. After proper drying, the coating weight of the imaging layer preferably is in the range of about 0.2 to about 5.0 g/$m^2$, and more preferably in the range from about 0.7 to about 2.5 g/$m^2$.

Further, known plasticizers, adhesion promoters, flow control agents and/or UV absorbers can be added to the copying compositions of the invention. The type and quantity of such additives depend on the purpose for which the imageable element according to the present invention is intended for use. In any case, however, care must be taken that the substances added do not absorb an excessive proportion of the radiation required for photo or thermal reactivity and thus reduce the imaging sensitivity of the composition.

Suitable plasticizers include dibutyl phthalate, dioctyl phthalate, diisooctyladipate, nitro esters, alkyl and aryl phosphate esters, chlorinated paraffins. Glycols or aliphatic polyols can also be added. If it is desired to ensure good storability under relative high atmospheric moisture conditions, the use of water-insoluble plasticizers is preferred.

Adhesion promoters can also be added. Suitable adhesion promoters include monomeric or polymeric organic silanes, nitrogen-containing heterocyclic compounds, such as those disclosed in U.S. Pat. Nos. 3,645,722, 3,622,234, and 3,827,908, heterocyclic mercaptan compounds, mercapto alkanoic acid anilides and mercapto alkanoic acid esters.

The present invention includes a method of producing an imaged element. The method includes the steps of:

method of producing an imaged element including the steps of:

providing an imageable element, including: a substrate; a crosslinked layer disposed on the substrate, wherein the crosslinked layer is formed from a polyfunctional crosslinkable resin and a crosslinking agent selected from the group consisting of: a polyvalent metal salt, a polyvalent metal complex, an amino resin crosslinking agent, an amido resin crosslinking agent, an aldehyde crosslinking agent and a combination thereof; and an imageable ink-receptive layer disposed on the crosslinked layer, the imageable ink-receptive layer including an ablation free imageable composition;

optionally subjecting the imageable ink-receptive layer to reaction conditions sufficient to produce an imageable crosslinked element having a crosslinked ink-receptive layer;

imagewise exposing the crosslinked imageable element to radiation to produce an imagewise exposed element having exposed and unexposed regions; and contacting the imagewise exposed element and a developer to produce the imaged element.

The present invention also includes a method of producing an imaged element. The method includes the steps of:

providing an imageable element according to the present invention including a substrate, a crosslinked layer disposed on the substrate and an imageable ink-receptive layer disposed on the crosslinked layer;

optionally subjecting the imageable ink-receptive layer to reaction conditions sufficient to produce an imageable crosslinked element having a crosslinked ink-receptive layer;

imagewise exposing the crosslinked imageable element to radiation to produce an imagewise exposed element having exposed and unexposed regions; and contacting the imagewise exposed element and a developer to produce the imaged element.

The imageable ink-receptive layer includes an ablation free imageable composition, which can be one of the following:

(1) a hydroxyfunctional resin including a covalently bound radiation sensitive group capable of increasing the solubility of the imageable composition in an alkaline developer upon exposure to radiation and an isocyanate crosslinking agent;

(2) a thermally sensitive polymer which exhibits an increased solubility in an aqueous developer solution upon heating, the thermally sensitive polymer including at least one covalently bonded unit and at least one thermally reversible non-covalently bonded unit, which includes a two or more centered H-bond within each the non-covalently bonded unit;

(3) a crosslinkable, polyfunctional alkali-soluble polymer and a divinyl ether;

(4) an acid curable composition, an acid generator and optionally, a photothermal converter;

(5) an aromatic diazonium salt containing compound;

(6) a free radical polymerizable composition comprising a polymerizable polyfunctional ethylenically unsaturated compound, a free radical generator and optionally a monofunctional ethylenically unsaturated comonomer;

(7) a crosslinkable composition comprising a polymerizable polyfunctional ethylenically unsaturated compound and optionally a photosensitizer; and (8) a composition comprising an aromatic diazonium salt containing compound, a polymerizable polyfunctional ethylenically unsaturated compound and at least one of a free radical generator and a photosensitizer.

Typically, the step of exposing the imageable element to ultraviolet radiation is carried out using a UV radiation source, such as a metal halide doped mercury lamp. Such radiation sources typically emit radiation in both the UV and visible spectral regions. Lasers as well as excimer lamps, having appropriate emission that overlaps with absorption of the compositions, may also be used.

The present invention further provides a method of producing an inked image. The method includes the steps of:

providing an imaged element including a substrate, a crosslinked layer disposed on the substrate and an imageable ink-receptive layer disposed on the crosslinked layer, wherein the imageable ink-receptive layer includes an ablation free imageable composition;

imagewise exposing the imageable element to radiation to produce an imagewise exposed element having exposed and unexposed regions;

contacting the imagewise exposed element and a developer to produce the imaged element; and contacting the imaged element and an emulsion ink to provide an inked image for printing.

Preferably, the emulsion ink includes a polyhydric alcohol. Polyhydric alcohols are preferred over water ink emulsions for various reasons, including the fact that polyhydric alcohol molecules do not evaporate as fast as water.

However, a combination of water and polyhydric alcohols can be used.

Any suitable polyhydric alcohol can be used in the emulsion ink, provided that the polyhydric alcohol is a liquid and is substantially immissible with ink. Polyethylene glycol oligomers such as diethylene glycol, triethylene glycol, and tetraethylene glycol, as well as ethylene glycol, propylene glycol, dipropylene glycol, tripropylene glycol, butanediol and glycerin are examples of liquid polyhydric alcohols that are preferred for the polyhydric alcohol phase of the single-fluid ink. The polyhydric alcohol phase may, of course, include mixtures of different liquid polyhydric alcohols.

The ink emulsion can be more complex than just a single polyhydric alcohol and/or a combination of a polyhydric alcohol and water. The ink emulsions can additionally contain one or more of the following:

(a) rheology modifiers; (b) desensitizer/phosphoric acid; (c) wetting agents; (d) hygroscopic agents; (e) anti-corrosive agents; (f) pH buffers; (g) surfactants; (h) chelating agents; and (i) water soluble polymers.

Single-fluid inks may be formulated with from about 5% to about 50%, preferably from about 20% to about 30% by weight of polyhydric alcohol phase based on the total weight of the ink composition. The amount of polyhydric alcohol phase necessary to achieve good toning and printing results depends upon the kind of plate being used and may be determined by straightforward testing.

The developer composition is dependent on the nature of the polymeric substance, but is preferably an aqueous composition. Common components of aqueous developers include surfactants, chelating agents, such as, salts of ethylenediamine tetraacetic acid, organic solvents, such as, benzyl alcohol, ethylene glycol monomethyl ether, ethylene glycol monoethyl ether, diacetone alcohol, butyl acetate, ethylene glycol methyl ether acetate, methyl isobutyl ketone and a mixture thereof, and alkaline components, such as organic amines, including alkanol amines, such as triethanol amine and methyl diethanol amine, inorganic metasilicates, organic metasilicates, hydroxides and bicarbonates.

The pH of the aqueous developer is preferably within about 5 to about 14, depending on the nature of the composition of the imaging layer. The development can be performed by any known manner, for instance, by rubbing the plate surface with a developing pad containing the foregoing developer or by pouring the developer on the plate surface and then rubbing the surface with a developing brush in water.

Printing inks are normal lithographic inks with emulsified ethylene glycol compounds (ethylene glycol, diethylene glycol or triethylene glycol etc.). When the ink is applied onto the plates, ethylene glycol is de-emulsified, covers the non-image area and repels ink. No fountain solution is needed for such printing processes.

The present invention is further described in the following examples, which are intended to be illustrative and not limiting.

Contact Angle Measurements

The dynamic contact angle of diethylene glycol was measured in soy oil using the video contact angle apparatus (VCA 2000, Advanced Surface Technology). A substrate was coated with a diethyleneglycol-receptive crosslinked layer and the coated substrate was immersed in soy oil. Three drops of diethyleneglycol were added and the contact angle was measured after equilibrium (about 6 minutes) and the contact angle values were averaged.

The contact angle measurement procedure is described by Jianbing Huang and Richard M. Goodman, *TAGA Proceedings*, Vol. 1, pages 154–167 (1995), the contents of which are incorporated herein by reference.

Press Trial Results/Toning Index

A 25% diethylene glycol (w/w) paste ink emulsion was prepared using Naturalith+ Cyan (NS26305). The key and sweep settings on the OMCSA press were initially determined using the Anthem plate (Presstek), which served as a control for this trial. The room temperature increased from 68 F to 72 F over the course of the trial. The ink transfer was slow, which is typical of these types of paste ink emulsions, but acceptable. Transfer appeared to be more acceptable at higher room temperatures. The premature breakdown of the emulsion in the ink fountain was not observed.

Prints from the trial were identified by a number and letter code to help eliminate any bias and subsequently ranked by a panel of six scientists for toning and overall print quality (toning, density and cleanliness). The final ranking represents an average value. Toning index ratings (1=best to 5=worst), which were taken as a subjective measure of background print quality, are provided in the following examples.

EXAMPLE 1

84.7 g of polyvinyl alcohol solution (5.9% Airvol 125 in water) was mixed with 6.9 g of ammonium zirconium carbonate (29% solution). 0.3 g of glycerol, 0.6 g of Triton X-100 and 107.5 g of water were added. The solution was spin coated on smooth aluminum substrates (DS substrates, available from KP Graphics) at 80 rpm for 3 min, to provide a first layer of about 1.5 g/m$^2$. The coating was cured at 145° C. for 3 min. The contact angle of diethylene glycol on the coating surface in soy oil was found to be 80°. Onto the first layer, a top layer was spin coated with solution of the following formulation:

6.6 g of polyvinyl acetal resin, described in preparation Example 5 of U.S. Pat. No. 5,700,619, 6.0 g of negative diazo resin (Nega 107, available from Panchim or PCAS), 0.075 g of 4-(phenylazo)-diphenylamine, 1.05 g of $H_3PO_4$ (10%) and 16.1 g of pigment (14% solid) were dissolved in 470 g of a solvent mixture of 2-methoxyethanol (30%), methanol (45%) methyl ethyl ketone (25%).

The plate precursors were imagewise exposed to UV radiation at 200 mJ/cm$^2$. They were hand developed with aqueous developer 955, available from KPGraphics, resulting in removal of the unexposed image (top) coating. Good quality images was obtained.

The plates were run on press (OMCSA press) with diethylene glycol emulsified ink. Slight background toning was observed.

EXAMPLE 2

The first layer of Example 1 was replaced by the following formulation: 28 g of polyacrylic acid solution (35% in water from Aldrich MW=100,000) was diluted with 104 g of water. 10.3 g of ammonium hydroxide (30% $NH_3$) and 5.2 g of zirconium ammonium carbonate (29% solution) were added. The solution was spin coated on smooth aluminum DS substrates.

The coating was cured at 150° C. for 20 min. The contact angle of diethylene glycol on the coating surface in soy oil was found to be 31°. Onto the first layer, a top layer was spin coated with a solution of the following formulation:

23.4 g of polyurethane triacrylate (80% non-volatile) resin (available from KPGraphics), 3.64 g of N-5000 diazonium condensate (prepared by consensation of p-diazo diphenyl sulfate with paraformaldehyde, isolated as the 2-OH, 4methoxy benzophenone-5 sulfonate salt available from PCAS), 5.27 g of cellulose acetate phalate (available from Eastman Chemicals), 5.97 g of Echo-310 (50% non-volatile), available from Echo-Lab, 0.92 g of Triazine, 3.4 g of $H_3PO_4$ (4% in 2-methoxyethanol), 0.49 g of Victoria blue BO dye, and 5.18 g of pigment (19% solids) were dissolved in 95.3 g of 2-methoxyethanol, 112.7 g of methanol, 138 g of dioxalane, 69.4 g of methyl ethyl ketone (MEK) and 18 g of n-butyl alcohol. The solution was spin coated. The obtained coating had approximately 0.8 to 1.2 g/m$^2$ coating weight.

The plate precursors were imagewise exposed and developed, as described in Example 1, except that aqueous developer 956 (available from KPGraphics) was used, resulting in removal of the unexposed top coating. Good quality images was obtained.

The plates were run on press (OMCSA press) with diethylene glycol emulsified ink. Clean image was printed initially, then slight background toning appeared.

EXAMPLE 3

The same as Example 2 except that the first layer was replaced by the following formulation: 40 g of polyacrylamide solution (50% in water from Aldrich, MW=10,000) was diluted with 160 g of water. 1 N NaOH was added dropwise until pH reached 10. Then 20 g of formaldehyde solution (37% in water) was added. The mixture was heated at 50° C. for one hour. When cooled down to room temperature, the mixture was spin coated on DS aluminum substrates.

The coating was cured at 150° C. for 3 min. The contact angle of diethylene glycol on the coating surface in soy oil was found to be 18°.

The plate precursors were imagewise exposed and developed, as described in Example 2, resulting in removal of the unexposed top coating. Good quality images was obtained.

The plates were run on press (OMCSA press) with diethylene glycol emulsified ink. Clean image was printed for more than 1000 copies.

The plates can also be used on waterless printing presses which currently use silicone based plates. They can also be used on Cortina presses, designed by KBA, primarily for newspaper applications.

EXAMPLE 4

Polyvinyl alcohol (PVOH) samples with silanol functionality (less than 1 mol % silanol groups) and methacrylate functionality (less than 3 mol % methacrylate groups) were obtained from Kuraray Inc in order to determine effects of small amounts of functionality on single fluid offset print quality. Experimental plates were prepared using silanol and methacrylamide functional PVOH and also a 50/50-blend of the silanol and methacrylate functional PVOH.

The PVOH non-functional control corresponds to the non-image area of an Anthem printing plate, available from Presstek.

TABLE 1

Toning Index of experimental plates

| Experimental Plate | Toning Index |
|---|---|
| PVOH (control) (non-functional) | 2 |
| Silanol PVOH (R-1130) | 2 |
| Methacrylamide PVOH (CM-318) | 1 |
| 50/50 Silanol/Methacrylamide PVOH Blend | 1 |

EXAMPLE 5

An aqueous solution of silanol functional PVOH was prepared by dissolving the powder (R-1130, which contains less than 0.5 mol % silanol groups, available from Kuraray Inc) in water and heating to 90° C. while stirring. A 165.1 g sample of the resulting solution was mixed with 12.4 g of an aqueous solution (29.4% active) of ammonium zirconium carbonate and 311.8 g of water at room temperature to give the non-image coating solution. The non-image coating solution was subsequently spin coated onto a DS aluminum substrate at 115 rpm for 3 minutes. The resulting coating was cured at 145° C. for 3 minutes. The DS substrate (a) and cured non-image coating (b) were subsequently spin-coated with the photopolymerizable diazo resin coating, as described in Example 1. The printing plate precursors were allowed to stand for 1 day and subsequently imagewise exposed and developed, as described in Example 1, which resulted in removal of the unexposed image coating. A fingernail test determined that the exposed image coating adhered to the non-image coating.

The imaged printing member thus generated was used in a single fluid offset ink printing trial (OMCSA press, 67° F., 54% relative humidity) where the ink emulsion composition was that described but not limited to ingredients listed in Table 2.

TABLE 2

Composition of ink emulsion

| Ingredient | Parts |
|---|---|
| B49-3873 Sun Quick Blue | 32.25 |
| Alkyd Resins | |
| Soy Oil | |
| Phthalocyanine Blue | |
| 6443M Var-Q-Set Gel (EXL-2443) | 33.15 |
| 10% Soy Oil | |
| 12% Alkalai treated linseed oil | |
| 4% Alkyd based linseed oil | |
| 41% Rosin ester (25% = modified phenolic) | |
| Petroleum Distillate | |
| Mangiesol | 4.875 |
| Technical grade white oil | |
| SST-3 PTFE | 0.375 |
| 2–4 micron particle size dispersion | |
| 2% Tioxide | |
| Cobalt/Manganese Lin-all P1 Blend | 1.125 |
| 5.8% Metal Salts in Carboxylic Acids | |
| 94.2% Heavy Petroleum Distillate | |
| AKS-3094 Special Antiskin Agent | 0.225 |
| 100% Polyethylene Compound CC-5192D | 3 |
| Diethylene Glycol | 25 |

The prints generated from the printing member and ink described in this example were given a toning index rating of 2.

EXAMPLE 6

An aqueous solution of silanol functional PVOH was prepared by dissolving the powder (R-2105, which contains less than 1 mol % silanol groups, available from Kuraray Inc) in water and heating to 90° C. with stirring. A 166.7 g sample of the resulting solution was mixed with 12.4 g of an aqueous solution of ammonium zirconium carbonate and 310.2 g of water at room temperature to give the non-image coating solution. The non-image coating solution was subsequently spin coated onto the DS substrate at 115 rpm for 3 minutes and subsequently cured at 145° C. for 3 minutes. The DS substrate (a) and cured non-image coating (b) were subsequently spin-coated with the photopolymerizable coating, as described in Example 2.

The resulting printing plate precursor was imagewise exposed and developed, as described in Example 2. A fingernail test determined that the exposed image layer adequately adhered to the non-image coating.

The imaged printing member thus generated was used in a single fluid offset ink printing trial, as described in Example 5. The prints generated in this example were given a toning index rating of 2.

EXAMPLE 7

An aqueous solution of methacrylamide functional PVOH was prepared by dissolving the powder (CM-318, which contains less than 3 mol % methacrylamide groups, available from Kuraray Inc.) in water and heating to 90° C. with stirring. A 163.5 g sample of the resulting solution was mixed with 12.4 g of an aqueous solution of ammonium zirconium carbonate and 313.4 g of water at room temperature to give the non-image coating solution. The non-image coating solution was subsequently spin coated onto the DS substrate at 115 rpm for 3 minutes and subsequently cured at 145° C. for 3 minutes.

The DS substrate (a) and cured non-image coating (b) were subsequently spin-coated with a photopolymerizable coating, as described in Example 1. The printing plate precursor thus generated was allowed to stand for 1 day, followed by imagewise exposure and development, as described in Example 5, resulting in removal of the unexposed image coating. A fingernail test determined that the exposed image layer adequately adhered to the non-image coating.

The imaged printing member thus generated was used in a single fluid offset ink printing trial, as described in Example 3. The prints generated in this example were given a toning index rating of 1.

EXAMPLE 8

An aqueous solution of methacrylamide functional PVOH was prepared by dissolving the powder (CM-318) in water and heating to 90° C. with stirring. An aqueous solution of silanol functional PVOH was prepared by dissolving the powder (R-1130) in water and heating to 90° C. with stirring. Equal mass fractions of each of these methacrylamide and silanol functional PVOH solutions were blended together using a standard laboratory mixer. A 171.2 g sample of the resulting solution was mixed with 12.4 g of an aqueous solution of ammonium zirconium carbonate and 308.6 g of water at room temperature to give the non-image coating solution.

The non-image coating solution was subsequently spin coated onto the DS substrate at 115 rpm for 3 minutes and was subsequently cured at 145° C. for 3 minutes.

The DS substrate (a) and cured non-image coating (b) was subsequently spin-coated with a photopolymerizable diazo resin coating, as described in Example 1. The resulting printing plate precursor was allowed to stand for 1 day, followed by imagewise exposure and development, as described in Example 1. A fingernail test determined that the exposed image layer adhered to the non-image coating.

The imaged printing member thus generated was used in a single fluid offset ink printing trial, as described in Example 5. The prints generated in this example were given a toning index rating of 1.

The present invention has been described with particular reference to the preferred embodiments. It should be understood that variations and modifications thereof can be devised by those skilled in the art without departing from the spirit and scope of the present invention. Accordingly, the present invention embraces all such alternatives, modifications and variations that fall within the scope of the appended claims.

What is claimed is:

1. An imageable element comprising:

(a) a substrate;

(b) a crosslinked layer disposed on the substrate comprising a polyvinyl alcohol and a crosslinking agent; and (c) an imageable ink-receptive layer comprising an ablation free imageable composition disposed on the crosslinked layer.

2. The imageable element of claim 1, where the substrate comprises aluminum.

3. The imageable element of claim 1, where the substrate comprises grained aluminum, anodized aluminum, or grained and anodized aluminum.

4. The imageable element of claim 1, where the polyvinyl alcohol comprises a silanol functional polyvinyl alcohol.

5. The imageable element of claim 1, where the polyvinyl alcohol comprises a methacrylamide functional polyvinyl alcohol.

6. The imageable element of claim 1, where the polyvinyl alcohol comprises a blend of a silanol functional polyvinyl alcohol and a methacrylamide functional polyvinyl alcohol.

7. The imageable element of claim 1, where the polyvinyl alcohol comprises a polyvinyl alcohol copolymer comprising a silanol moiety and a methacrylamide moiety.

8. The imageable element of claim 1, where the polyvinyl alcohol comprises a carboxy functional polyvinyl alcohol.

9. The imageable element of claim 1, where the crosslinking agent comprises a polyvalent metal salt or complex.

10. The imageable element of claim 1, where the crosslinking agent comprises ammonium zirconium carbonate.

11. The imageable element of claim 1, where the crosslinking agent comprises an aldehyde.

12. The imageable element of claim 1, where the crosslinking agent comprises formaldehyde.

13. The imageable element of claim 1, where the polyvinyl alcohol comprises a methacrylamide functional polyvinyl alcohol and the crosslinking agent comprises ammonium zirconium carbonate.

14. The imageable element of claim 1, where the polyvinyl alcohol comprises a blend of a silanol functional polyvinyl alcohol and a methacrylamide functional polyvinyl alcohol and the crosslinking agent comprises ammonium zirconium carbonate.

15. The imageable element of claim 1, where the imageable ink-receptive layer comprises a polyvinyl acetal resin.

16. The imageable element of claim 15, where the imageable ink-receptive layer further comprises a negative diazo resin.

17. The imageable element of claim 1, where the imageable ink-receptive layer comprises a polyurethane triacrylate resin.

18. The imageable element of claim 17, where the imageable ink-receptive layer further comprises an aromatic diazonium salt containing compound.

19. The imageable element of claim 1, where the imageable ink-receptive layer comprises a radiation sensitive polymer that exhibits increased or decreased solubility in aqueous developer solution upon to radiation.

20. The imageable element of claim 1, where the imageable ink-receptive layer further comprises a polymerizable polyfunctional ethylenically unsaturated compound and at least one of a radical generator, photosensitizer, photoinitiator, or coinitiator.

21. The imageable element of claim 20, where the radical generator is activated by an ultraviolet, visible, infrared or heat radiation.

22. An imageable element comprising:

(a) a substrate;

(b) a crosslinked layer disposed on the substrate comprising a methacrylamide functional polyvinyl alcohol and a crosslinking agent; and (c) an imageable ink-receptive layer disposed on the crosslinked layer.

23. The imageable element of claim 22 wherein the crosslinking agent comprises ammonium zirconium carbonate.

24. The imageable element of claim 22 wherein the crosslinked layer further comprises a silanol functional polyvinyl alcohol.

25. The imageable element of claim 24 wherein the crosslinking agent comprises ammonium zirconium carbonate.

26. The imageable element of claim 22 wherein the methacrylamide functional polyvinyl alcohol further comprises a silanol moiety.

27. An imageable element comprising:

(a) a substrate;

(b) a crosslinked layer disposed on the substrate comprising a carboxy functional polyvinyl alcohol and a crosslinking agent; and (c) an imageable ink-receptive layer disposed on the crosslinked layer.

28. An imageable element comprising:

(a) a substrate;

(b) a crosslinked layer disposed on the substrate comprising a polyvinyl alcohol and a crosslinking agent; and (c) an imageable ink-receptive layer disposed on the crosslinked layer wherein the imageable ink-receptive layer comprises polyvinyl acetal resin.

29. The imageable element of claim 28 wherein the imageable ink-receptive layer further comprises a negative diazo resin.

30. An imageable element comprising:

(a) a substrate;

(b) a crosslinked layer disposed on the substrate comprising a polyvinyl alcohol and a crosslinking agent; and (c) an imageable ink-receptive layer disposed on the crosslinked layer wherein the imageable ink-receptive layer comprises a polyurethane triacrylate resin.

31. The imageable element of claim 30 wherein the imageable ink-receptive layer further comprises an aromatic diazonium salt containing compound.

32. A negative working imageable element comprising:

(a) a substrate;

(b) a crosslinked layer disposed on the substrate comprising a polyvinyl alcohol and a crosslinking agent; and (c) a negative working imageable ink-receptive layer disposed on the crosslinked layer wherein the imageable ink-receptive layer comprises a polymerizable polyfunctional ethylenically unsaturated compound and at least one of a radical generator, photosensitizer, photoinitiator, or coinitiator.

33. The imageable element of claim 32, where the radical generator is activated by ultraviolet, visible, infrared or heat radiation.

* * * * *

UNITED STATES PATENT AND TRADEMARK OFFICE

CERTIFICATE OF CORRECTION

PATENT NO. : 6,821,583 B2
DATED : November 23, 2004
INVENTOR(S) : Grant Thomas Donald Shouldice et al.

It is certified that error appears in the above-identified patent and that said Letters Patent is hereby corrected as shown below:

Column 35,
Line 10, after the word "upon" insert the word -- exposure --

Signed and Sealed this

Twenty-second Day of February, 2005

JON W. DUDAS
*Director of the United States Patent and Trademark Office*